US012179929B2

(12) United States Patent
Suciu et al.

(10) Patent No.: US 12,179,929 B2
(45) Date of Patent: *Dec. 31, 2024

(54) ENGINE MOUNT SYSTEM FOR A GAS TURBINE ENGINE

(71) Applicant: RTX CORPORATION, Farmington, CT (US)

(72) Inventors: Gabriel L. Suciu, Glastonbury, CT (US); Brian D. Merry, Andover, CT (US); Christopher M. Dye, San Diego, CA (US); Steven B. Johnson, Marlborough, CT (US); Frederick M. Schwarz, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/215,394

(22) Filed: Jun. 28, 2023

(65) Prior Publication Data
US 2024/0076050 A1 Mar. 7, 2024

Related U.S. Application Data

(63) Continuation of application No. 17/395,553, filed on Aug. 6, 2021, now Pat. No. 11,731,773, which is a (Continued)

(51) Int. Cl.
*B64D 27/40* (2024.01)
*F01D 5/06* (2006.01)
(Continued)

(52) U.S. Cl.
CPC .............. *B64D 27/40* (2024.01); *F01D 5/06* (2013.01); *F01D 9/02* (2013.01); *F01D 15/12* (2013.01);
(Continued)

(58) Field of Classification Search
CPC ........ B64D 27/10; B64D 27/12; B64D 27/26; B64D 2027/262; B64D 2027/266;
(Continued)

(56) References Cited

U.S. PATENT DOCUMENTS 2,258,792 A 10/1941 New
2,608,821 A 9/1952 Hunsaker
(Continued)

FOREIGN PATENT DOCUMENTS

EP 0791383 A1 8/1997
EP 0860593 A1 8/1998
(Continued)

OTHER PUBLICATIONS

International Search Report and Written Opinion for PCT Application No. PCT/US2012/072271 dated on Mar. 8, 2013, 9 pages.
(Continued)

*Primary Examiner* — Alain Chau
(74) *Attorney, Agent, or Firm* — Carlson, Gaskey & Olds, P.C.

(57) ABSTRACT

A gas turbine engine includes, among other things, a propulsor section including a rotor and blades, a gear train, a compressor section and a turbine section. A static structure includes a first case and a second case. The first case includes a first engine mount location. The second case includes a second engine mount location. The first engine mount location is axially near the gear train.

19 Claims, 11 Drawing Sheets

Related U.S. Application Data continuation of application No. 16/405,149, filed on May 7, 2019, now Pat. No. 11,286,883, which is a continuation of application No. 15/173,288, filed on Jun. 3, 2016, now Pat. No. 10,451,004, which is a continuation of application No. 14/755,221, filed on Jun. 30, 2015, now abandoned, which is a continuation of application No. 14/190,429, filed on Feb. 26, 2014, now abandoned, which is a continuation-in-part of application No. 13/340,988, filed on Dec. 30, 2011, now Pat. No. 8,800,914, which is a continuation-in-part of application No. 12/131,876, filed on Jun. 2, 2008, now Pat. No. 8,128,021.

(51) Int. Cl.
| | | |
|---|---|---|
| *F01D 9/02* | (2006.01) | |
| *F01D 15/12* | (2006.01) | |
| *F01D 25/24* | (2006.01) | |
| *F01D 25/28* | (2006.01) | |
| *F02C 3/107* | (2006.01) | |
| *F02C 7/20* | (2006.01) | |
| *F02C 7/36* | (2006.01) | |
| *F02C 9/18* | (2006.01) | |
| *F02C 9/20* | (2006.01) | |
| *F02K 1/15* | (2006.01) | |
| *F02K 3/06* | (2006.01) | |

(52) U.S. Cl.
CPC ............ *F01D 25/24* (2013.01); *F01D 25/28* (2013.01); *F02C 3/107* (2013.01); *F02C 7/20* (2013.01); *F02C 7/36* (2013.01); *F02C 9/18* (2013.01); *F02C 9/20* (2013.01); *F02K 1/15* (2013.01); *F02K 3/06* (2013.01); *B64D 27/404* (2024.01); *B64D 27/406* (2024.01); *F05D 2220/32* (2013.01); *F05D 2220/36* (2013.01); *F05D 2260/4031* (2013.01); *F05D 2260/40311* (2013.01); *F05D 2270/42* (2013.01)

(58) Field of Classification Search
CPC .... B64D 27/40; B64D 27/402; B64D 27/404; B64D 27/406; F01D 25/24; F01D 25/28; F02C 7/20; F02C 3/04
See application file for complete search history.

(56) References Cited

U.S. PATENT DOCUMENTS

| | | |
|---|---|---|
| 2,748,623 A | 6/1956 | Hill |
| 2,936,655 A | 5/1960 | Peterson et al. |
| 3,021,731 A | 2/1962 | Stoeckicht |
| 3,033,002 A | 5/1962 | William et al. |
| 3,111,005 A | 11/1963 | Howell et al. |
| 3,185,857 A | 5/1965 | Johnson |
| 3,194,487 A | 7/1965 | Tyler et al. |
| 3,222,017 A | 12/1965 | Melvin |
| 3,287,906 A | 11/1966 | McCormick |
| 3,352,178 A | 11/1967 | Lindgren et al. |
| 3,363,419 A | 1/1968 | Light et al. |
| 3,390,527 A | 7/1968 | Decher et al. |
| 3,412,560 A | 11/1968 | Gaubatz |
| 3,468,473 A | 9/1969 | Davies et al. |
| 3,526,092 A | 9/1970 | Steel et al. |
| 3,664,612 A | 5/1972 | Skidmore et al. |
| 3,729,957 A | 5/1973 | Petrie et al. |
| 3,747,343 A | 7/1973 | Rosen |
| 3,754,484 A | 8/1973 | Roberts |
| 3,765,623 A | 10/1973 | Donelson et al. |
| 3,779,010 A | 12/1973 | Chamay et al. |
| 3,820,719 A | 6/1974 | Clark et al. |
| 3,843,277 A | 10/1974 | Ehrich |
| 3,861,139 A | 1/1975 | Jones |
| 3,886,737 A | 6/1975 | Grieb |
| 3,892,358 A | 7/1975 | Gisslen |
| 3,932,058 A | 1/1976 | Harner et al. |
| 3,935,558 A | 1/1976 | Miller et al. |
| 3,988,889 A | 11/1976 | Chamay et al. |
| 4,013,246 A | 3/1977 | Nightingale |
| 4,118,927 A | 10/1978 | Kronogard |
| 4,130,872 A | 12/1978 | Haloff |
| 4,136,286 A | 1/1979 | O'Halloran et al. |
| 4,137,708 A | 2/1979 | Aspinwall et al. |
| 4,220,171 A | 9/1980 | Ruehr et al. |
| 4,233,555 A | 11/1980 | Roche |
| 4,240,250 A | 12/1980 | Harris |
| 4,284,174 A | 8/1981 | Salvana et al. |
| 4,289,360 A | 9/1981 | Zirin |
| 4,405,892 A | 9/1983 | Staerzl |
| 4,452,567 A | 6/1984 | Treby et al. |
| 4,463,553 A | 8/1984 | Boudigues |
| 4,471,609 A | 9/1984 | Porter et al. |
| 4,478,551 A | 10/1984 | Honeycutt, Jr. et al. |
| 4,649,114 A | 3/1987 | Miltenburger et al. |
| 4,660,376 A | 4/1987 | Johnson |
| 4,696,156 A | 9/1987 | Burr et al. |
| 4,704,862 A | 11/1987 | Dennison et al. |
| 4,722,357 A | 2/1988 | Wynosky |
| 4,808,076 A | 2/1989 | Jarmon et al. |
| 4,809,498 A | 3/1989 | Giffin, III et al. |
| 4,827,712 A | 5/1989 | Coplin |
| 4,879,624 A | 11/1989 | Jones et al. |
| 4,885,912 A | 12/1989 | Nakhamkin |
| 4,916,894 A | 4/1990 | Adamson et al. |
| 4,966,338 A | 10/1990 | Gordon |
| 4,979,362 A | 12/1990 | Vershure, Jr. |
| 5,058,617 A | 10/1991 | Stockman et al. |
| 5,074,109 A | 12/1991 | Mandet et al. |
| 5,079,916 A | 1/1992 | Johnson |
| 5,081,832 A | 1/1992 | Mowill |
| 5,102,379 A | 4/1992 | Pagluica et al. |
| 5,136,839 A | 8/1992 | Armstrong |
| 5,141,400 A | 8/1992 | Murphy et al. |
| 5,157,915 A | 10/1992 | Bart |
| 5,160,251 A | 11/1992 | Ciokajlo |
| 5,168,208 A | 12/1992 | Schultz et al. |
| 5,174,525 A | 12/1992 | Schilling |
| 5,182,464 A | 1/1993 | Woodworth et al. |
| 5,252,905 A | 10/1993 | Wills et al. |
| 5,273,393 A | 12/1993 | Jones et al. |
| 5,275,357 A | 1/1994 | Seelen et al. |
| 5,277,382 A | 1/1994 | Seelen et al. |
| 5,307,622 A | 5/1994 | Ciokajlo et al. |
| 5,317,877 A | 6/1994 | Stuart |
| 5,320,307 A | 6/1994 | Spofford et al. |
| 5,361,580 A | 11/1994 | Ciokajlo et al. |
| 5,372,338 A | 12/1994 | Carlin et al. |
| 5,388,964 A | 2/1995 | Ciokajlo et al. |
| 5,390,068 A | 2/1995 | Schultz et al. |
| 5,409,184 A | 4/1995 | Udall et al. |
| 5,433,674 A | 7/1995 | Sheridan et al. |
| 5,443,229 A | 8/1995 | O'Brien et al. |
| 5,447,411 A | 9/1995 | Curley et al. |
| 5,452,575 A | 9/1995 | Freid |
| 5,466,198 A | 11/1995 | McKibbin et al. |
| 5,474,258 A | 12/1995 | Taylor et al. |
| 5,497,961 A | 3/1996 | Newton |
| 5,524,847 A | 6/1996 | Brodell et al. |
| 5,594,665 A | 1/1997 | Walter et al. |
| 5,625,276 A | 4/1997 | Scott et al. |
| 5,634,767 A | 6/1997 | Dawson |
| 5,677,060 A | 10/1997 | Terentieva et al. |
| 5,694,027 A | 12/1997 | Satake et al. |
| 5,694,765 A | 12/1997 | Hield et al. |
| 5,729,059 A | 3/1998 | Kilroy et al. |
| 5,734,255 A | 3/1998 | Thompson et al. |
| 5,734,555 A | 3/1998 | McMahon |
| 5,740,668 A | 4/1998 | Fujiwara et al. |
| 5,746,391 A | 5/1998 | Rodgers et al. |
| 5,754,033 A | 5/1998 | Thomson |
| 5,778,659 A | 7/1998 | Duesler et al. |

(56) References Cited

U.S. PATENT DOCUMENTS

| | | | |
|---|---|---|---|
| 5,791,789 A | 8/1998 | Van Duyn et al. | |
| 5,806,303 A | 9/1998 | Johnson | |
| 5,810,287 A | 9/1998 | O'Boyle et al. | |
| 5,857,836 A | 1/1999 | Stickler et al. | |
| 5,860,276 A | 1/1999 | Newton | |
| 5,860,623 A * | 1/1999 | Dunstan | B64D 27/40 |
| | | | 60/797 |
| 5,871,175 A | 2/1999 | Demouzon et al. | |
| 5,871,176 A | 2/1999 | Demouzon et al. | |
| 5,871,177 A | 2/1999 | Demouzon et al. | |
| 5,886,890 A | 3/1999 | Ishida et al. | |
| 5,915,917 A | 6/1999 | Eveker et al. | |
| 5,921,500 A | 7/1999 | Ellis et al. | |
| 5,927,644 A | 7/1999 | Ellis et al. | |
| 5,949,153 A | 9/1999 | Tison et al. | |
| 5,975,841 A | 11/1999 | Lindemuth et al. | |
| 5,985,470 A | 11/1999 | Spitsberg et al. | |
| 6,073,439 A | 6/2000 | Beaven et al. | |
| 6,104,171 A | 8/2000 | Dvorsky et al. | |
| 6,126,110 A | 10/2000 | Seaquist et al. | |
| 6,138,949 A | 10/2000 | Manende et al. | |
| 6,189,830 B1 | 2/2001 | Schnelz et al. | |
| 6,209,311 B1 | 4/2001 | Itoh et al. | |
| 6,223,616 B1 | 5/2001 | Sheridan | |
| 6,260,351 B1 | 7/2001 | Delano et al. | |
| 6,296,203 B1 * | 10/2001 | Manteiga | F16C 11/0614 |
| | | | 60/797 |
| 6,315,815 B1 | 11/2001 | Spadaccini et al. | |
| 6,318,070 B1 | 11/2001 | Rey et al. | |
| 6,330,995 B1 * | 12/2001 | Mangeiga | B64D 27/40 |
| | | | 244/54 |
| 6,339,927 B1 | 1/2002 | DiPietro, Jr. | |
| 6,378,308 B1 | 4/2002 | Pfluger | |
| 6,387,456 B1 | 5/2002 | Eaton, Jr. et al. | |
| 6,398,161 B1 | 6/2002 | Jule et al. | |
| 6,474,597 B1 | 11/2002 | Cazenave | |
| 6,517,027 B1 | 2/2003 | Abruzzese | |
| 6,517,341 B1 | 2/2003 | Brun et al. | |
| 6,555,929 B1 | 4/2003 | Eaton et al. | |
| 6,607,165 B1 | 8/2003 | Manteiga et al. | |
| 6,619,030 B1 | 9/2003 | Seda et al. | |
| 6,631,310 B1 | 10/2003 | Leslie | |
| 6,639,331 B2 | 10/2003 | Schultz | |
| 6,647,707 B2 | 11/2003 | Dev | |
| 6,652,222 B1 | 11/2003 | Wojtyczka et al. | |
| 6,653,821 B2 | 11/2003 | Kern et al. | |
| 6,657,416 B2 | 12/2003 | Kern et al. | |
| 6,663,530 B2 | 12/2003 | Poulin et al. | |
| 6,668,629 B1 | 12/2003 | Leslie | |
| 6,669,393 B2 | 12/2003 | Schilling | |
| 6,708,482 B2 | 3/2004 | Seda | |
| 6,708,925 B2 | 3/2004 | Udall | |
| 6,709,492 B1 | 3/2004 | Spadaccini et al. | |
| 6,732,502 B2 | 5/2004 | Seda et al. | |
| 6,735,954 B2 | 5/2004 | MacFarlane et al. | |
| 6,763,653 B2 | 7/2004 | Orlando et al. | |
| 6,792,759 B2 | 9/2004 | Rollins, III | |
| 6,814,541 B2 | 11/2004 | Evans et al. | |
| 6,843,449 B1 | 1/2005 | Manteiga et al. | |
| 6,847,297 B2 | 1/2005 | Lavoie et al. | |
| 6,855,089 B2 | 2/2005 | Poulin et al. | |
| 6,883,303 B1 | 4/2005 | Seda | |
| 6,892,115 B2 | 5/2005 | Berkcan et al. | |
| 6,895,741 B2 | 5/2005 | Rago et al. | |
| 6,899,518 B2 | 5/2005 | Lucas et al. | |
| 6,909,942 B2 | 6/2005 | Andarawis et al. | |
| 6,914,763 B2 | 7/2005 | Reedy | |
| 6,935,591 B2 | 8/2005 | Udall | |
| 6,966,174 B2 | 11/2005 | Paul | |
| 6,976,655 B2 | 12/2005 | Thompson | |
| 6,985,784 B2 | 1/2006 | Vandevanter et al. | |
| 6,999,291 B2 | 2/2006 | Andarawis et al. | |
| 7,019,495 B2 | 3/2006 | Patterson | |
| 7,021,042 B2 | 4/2006 | Law | |
| 7,021,585 B2 | 4/2006 | Loewenstein et al. | |
| 7,043,340 B2 | 5/2006 | Papallo et al. | |
| 7,055,306 B2 | 6/2006 | Jones et al. | |
| 7,055,330 B2 | 6/2006 | Miller | |
| 7,104,918 B2 | 9/2006 | Mitrovic | |
| 7,134,286 B2 | 11/2006 | Markarian et al. | |
| 7,144,349 B2 | 12/2006 | Mitrovic | |
| 7,147,436 B2 | 12/2006 | Suciu et al. | |
| 7,195,446 B2 | 3/2007 | Seda et al. | |
| 7,216,475 B2 | 5/2007 | Johnson | |
| 7,219,490 B2 | 5/2007 | Dev | |
| 7,223,197 B2 | 5/2007 | Poulin et al. | |
| 7,246,484 B2 | 7/2007 | Giffin, III et al. | |
| 7,269,938 B2 | 9/2007 | Moniz et al. | |
| 7,299,621 B2 | 11/2007 | Bart et al. | |
| 7,301,738 B2 | 11/2007 | Pearlman et al. | |
| 7,309,210 B2 | 12/2007 | Suciu et al. | |
| 7,328,580 B2 | 2/2008 | Lee et al. | |
| 7,334,392 B2 | 2/2008 | Moniz et al. | |
| 7,338,259 B2 | 3/2008 | Shah et al. | |
| 7,374,403 B2 | 5/2008 | Decker et al. | |
| 7,406,830 B2 | 8/2008 | Valentian et al. | |
| 7,409,819 B2 | 8/2008 | Henry | |
| 7,500,365 B2 | 3/2009 | Suciu et al. | |
| 7,513,103 B2 | 4/2009 | Orlando et al. | |
| 7,527,220 B2 | 5/2009 | Dron | |
| 7,557,544 B2 | 7/2009 | Heinz et al. | |
| 7,591,754 B2 | 9/2009 | Duong et al. | |
| 7,594,404 B2 | 9/2009 | Somanath et al. | |
| 7,600,370 B2 | 10/2009 | Dawson | |
| 7,610,763 B2 | 11/2009 | Somanath et al. | |
| 7,632,064 B2 | 12/2009 | Somanath et al. | |
| 7,656,060 B2 | 2/2010 | Algrain | |
| 7,662,059 B2 | 2/2010 | McCune | |
| 7,665,293 B2 | 2/2010 | Wilson, Jr. et al. | |
| 7,685,808 B2 | 3/2010 | Orlando et al. | |
| 7,694,505 B2 | 4/2010 | Schilling | |
| 7,704,178 B2 | 4/2010 | Sheridan et al. | |
| 7,716,914 B2 | 5/2010 | Schilling | |
| 7,721,549 B2 | 5/2010 | Baran | |
| 7,762,086 B2 | 7/2010 | Schwark | |
| 7,765,786 B2 | 8/2010 | Klingels et al. | |
| 7,797,946 B2 | 9/2010 | Kumar et al. | |
| 7,806,363 B2 * | 10/2010 | Udall | B64D 27/40 |
| | | | 248/556 |
| 7,806,651 B2 | 10/2010 | Kennepohl et al. | |
| 7,815,417 B2 | 10/2010 | Somanath et al. | |
| 7,816,813 B2 | 10/2010 | Yagudayev et al. | |
| 7,824,305 B2 | 11/2010 | Duong et al. | |
| 7,828,682 B2 | 11/2010 | Smook | |
| 7,832,193 B2 | 11/2010 | Orlando et al. | |
| 7,841,163 B2 | 11/2010 | Welch et al. | |
| 7,841,165 B2 | 11/2010 | Orlando et al. | |
| 7,871,247 B2 | 1/2011 | Shah et al. | |
| 7,882,691 B2 | 2/2011 | Lemmers, Jr. et al. | |
| 7,882,693 B2 | 2/2011 | Schilling | |
| 7,926,260 B2 | 4/2011 | Sheridan et al. | |
| 7,942,079 B2 | 5/2011 | Russ | |
| 7,942,580 B2 | 5/2011 | Audart-Noel et al. | |
| 7,950,237 B2 | 5/2011 | Grabowski et al. | |
| 7,959,532 B2 | 6/2011 | Suciu et al. | |
| 7,997,868 B1 | 8/2011 | Liang | |
| 8,015,798 B2 | 9/2011 | Norris et al. | |
| 8,015,828 B2 | 9/2011 | Moniz et al. | |
| 8,061,969 B2 | 11/2011 | Durocher et al. | |
| 8,074,440 B2 | 12/2011 | Kohlenberg et al. | |
| 8,075,261 B2 | 12/2011 | Merry et al. | |
| 8,091,371 B2 | 1/2012 | Durocher et al. | |
| 8,104,262 B2 | 1/2012 | Marshall | |
| 8,104,265 B2 | 1/2012 | Kupratis | |
| 8,104,289 B2 | 1/2012 | McCune et al. | |
| 8,106,633 B2 | 1/2012 | Dozier et al. | |
| 8,128,021 B2 | 3/2012 | Suciu et al. | |
| 8,166,748 B2 | 5/2012 | Schilling | |
| 8,172,717 B2 | 5/2012 | Lopez et al. | |
| 8,191,352 B2 | 6/2012 | Schilling | |
| 8,205,432 B2 | 6/2012 | Sheridan | |
| 8,220,245 B1 | 7/2012 | Papandreas | |
| 8,256,707 B2 | 9/2012 | Suciu et al. | |
| 8,297,916 B1 | 10/2012 | McCune et al. | |

(56) References Cited

U.S. PATENT DOCUMENTS

| | | | |
|---|---|---|---|
| 8,297,917 | B1 | 10/2012 | McCune et al. |
| 8,313,280 | B2 | 11/2012 | Hurwitz et al. |
| 8,505,432 | B2 | 8/2013 | Kidd et al. |
| 8,695,920 | B2 | 4/2014 | Suciu et al. |
| 11,286,883 | B2 * | 3/2022 | Suciu ............ F02C 3/107 |
| 2002/0172593 | A1 | 11/2002 | Udall |
| 2003/0097844 | A1 | 5/2003 | Seda |
| 2003/0163984 | A1 | 9/2003 | Seda et al. |
| 2003/0235523 | A1 | 12/2003 | Lyubovsky et al. |
| 2005/0138914 | A1 | 6/2005 | Paul |
| 2005/0257528 | A1 | 11/2005 | Dunbar, Jr. |
| 2006/0029894 | A1 | 2/2006 | Zinn et al. |
| 2006/0090448 | A1 | 5/2006 | Henry |
| 2006/0090451 | A1 | 5/2006 | Moniz et al. |
| 2006/0130456 | A1 | 6/2006 | Suciu et al. |
| 2006/0177302 | A1 | 8/2006 | Berry |
| 2006/0179818 | A1 | 8/2006 | Merchant |
| 2006/0228206 | A1 | 10/2006 | Decker et al. |
| 2006/0244327 | A1 | 11/2006 | Kundel |
| 2006/0248900 | A1 | 11/2006 | Suciu et al. |
| 2007/0084218 | A1 | 4/2007 | Udall |
| 2007/0125066 | A1 | 6/2007 | Orlando et al. |
| 2007/0205323 | A1 | 9/2007 | Lionel et al. |
| 2007/0262661 | A1 | 11/2007 | Ai |
| 2008/0003096 | A1 | 1/2008 | Kohli et al. |
| 2008/0022653 | A1 | 1/2008 | Schilling |
| 2008/0056888 | A1 | 3/2008 | Somanath et al. |
| 2008/0073460 | A1 | 3/2008 | Beardsley et al. |
| 2008/0098713 | A1 | 5/2008 | Orlando et al. |
| 2008/0098718 | A1 | 5/2008 | Henry et al. |
| 2008/0116009 | A1 | 5/2008 | Sheridan et al. |
| 2008/0116010 | A1 | 5/2008 | Portlock et al. |
| 2008/0148881 | A1 | 6/2008 | Moniz et al. |
| 2008/0149445 | A1 | 6/2008 | Kern et al. |
| 2008/0169378 | A1 | 7/2008 | Beaufort et al. |
| 2008/0184694 | A1 | 8/2008 | Guimbard et al. |
| 2008/0230675 | A1 * | 9/2008 | Audart-Noel ......... F02C 7/20 244/54 |
| 2008/0276621 | A1 | 11/2008 | Somanath et al. |
| 2008/0304974 | A1 | 12/2008 | Marshall et al. |
| 2008/0315033 | A1 | 12/2008 | Diochon et al. |
| 2008/0317588 | A1 | 12/2008 | Grabowski et al. |
| 2009/0007569 | A1 | 1/2009 | Lemmers, Jr. et al. |
| 2009/0053058 | A1 | 2/2009 | Kohlenberg et al. |
| 2009/0056306 | A1 | 3/2009 | Suciu et al. |
| 2009/0056343 | A1 | 3/2009 | Suciu et al. |
| 2009/0067993 | A1 | 3/2009 | Roberge et al. |
| 2009/0097967 | A1 | 4/2009 | Smith et al. |
| 2009/0155070 | A1 | 6/2009 | Duchatelle et al. |
| 2009/0183512 | A1 | 7/2009 | Suciu et al. |
| 2009/0229242 | A1 | 9/2009 | Schwark |
| 2009/0245997 | A1 | 10/2009 | Hurwitz et al. |
| 2009/0293445 | A1 | 12/2009 | Ress, Jr. |
| 2009/0304518 | A1 | 12/2009 | Kodama et al. |
| 2009/0314881 | A1 | 12/2009 | Suciu et al. |
| 2009/0317229 | A1 | 12/2009 | Suciu et al. |
| 2009/0320488 | A1 | 12/2009 | Gilson et al. |
| 2010/0005810 | A1 | 1/2010 | Jarrell et al. |
| 2010/0007207 | A1 | 1/2010 | Peuser |
| 2010/0080700 | A1 | 4/2010 | Venter |
| 2010/0105516 | A1 | 4/2010 | Sheridan et al. |
| 2010/0126141 | A1 | 5/2010 | Schilling |
| 2010/0127117 | A1 | 5/2010 | Combes et al. |
| 2010/0132376 | A1 | 6/2010 | Durocher et al. |
| 2010/0132377 | A1 | 6/2010 | Durocher et al. |
| 2010/0147997 | A1 | 6/2010 | Martinou et al. |
| 2010/0148396 | A1 | 6/2010 | Xie et al. |
| 2010/0154384 | A1 | 6/2010 | Schilling |
| 2010/0170980 | A1 | 7/2010 | Haramburu et al. |
| 2010/0181419 | A1 | 7/2010 | Haramburu et al. |
| 2010/0212281 | A1 | 8/2010 | Sheridan |
| 2010/0218483 | A1 | 9/2010 | Smith |
| 2010/0219779 | A1 | 9/2010 | Bradbrook |
| 2010/0301617 | A1 | 12/2010 | Lundbladh |
| 2010/0317477 | A1 | 12/2010 | Sheridan et al. |
| 2010/0326050 | A1 | 12/2010 | Schilling et al. |
| 2010/0331139 | A1 | 12/2010 | McCune |
| 2011/0056208 | A1 | 3/2011 | Norris et al. |
| 2011/0106510 | A1 | 5/2011 | Poon |
| 2011/0114786 | A1 | 5/2011 | Guillet et al. |
| 2011/0116510 | A1 | 5/2011 | Breslin et al. |
| 2011/0120078 | A1 | 5/2011 | Schwark, Jr. et al. |
| 2011/0120081 | A1 | 5/2011 | Schwark, Jr. et al. |
| 2011/0130246 | A1 | 6/2011 | McCune et al. |
| 2011/0149624 | A1 | 6/2011 | Yamanaka |
| 2011/0159797 | A1 | 6/2011 | Beltman et al. |
| 2011/0167790 | A1 | 7/2011 | Cloft et al. |
| 2011/0293423 | A1 | 12/2011 | Bunker et al. |
| 2012/0007431 | A1 | 1/2012 | Jang et al. |
| 2012/0017603 | A1 | 1/2012 | Bart et al. |
| 2012/0124964 | A1 | 5/2012 | Hasel et al. |
| 2013/0011547 | A1 | 1/2013 | Girard et al. |
| 2013/0115476 | A1 | 5/2013 | Castle et al. |

FOREIGN PATENT DOCUMENTS

| | | |
|---|---|---|
| EP | 1142850 A1 | 10/2001 |
| EP | 1435475 A2 | 7/2004 |
| EP | 1956224 A2 | 8/2008 |
| EP | 1959114 A2 | 8/2008 |
| EP | 2009249 A2 | 12/2008 |
| EP | 2028359 A2 | 2/2009 |
| EP | 2098704 A2 | 9/2009 |
| EP | 2157305 A2 | 2/2010 |
| GB | 1309721 A | 3/1973 |
| GB | 1516041 A | 6/1978 |
| GB | 2041090 A | 9/1980 |
| GB | 2130340 A | 5/1984 |
| GB | 2199375 A | 7/1988 |
| GB | 2419639 A | 5/2006 |
| GB | 2426792 A | 12/2006 |
| GB | 2419639 B | 9/2009 |
| RU | 2315887 C2 | 1/2008 |
| WO | 03052300 A1 | 6/2003 |
| WO | 2007038674 A1 | 4/2007 |
| WO | 2008045058 A1 | 4/2008 |
| WO | 2008045072 A1 | 4/2008 |

OTHER PUBLICATIONS

Ivchenko-Progress AI-727M. Jane's Aero-engines, Aero-engines—Turbofan. Nov. 27, 2011.

Ivchenko-Progress D-436. Jane's Aero-engines, Aero-engines—Turbofan. Feb. 8, 2012.

Ivchenko-Progress D-727. Jane's Aero-engines, Aero-engines—Turbofan. Feb. 7, 2007.

Jacobson, N.S. (1993). Corrosion of silicon-based ceramics in combustion environments. J. Am. Ceram. Soc. 76(1). pp. 3-28.

Jeng, Y.-L., Lavernia, E.J. (1994). Processing of molybdenum disilicide. J. of Mat. Sci. vol. 29. 1994. pp. 2557-2571.

Johnston, R.P. and Hemsworth, M.C. (1978). Energy efficient engine preliminary design and integration studies. Jun. 1, 1978. pp. 1-28.

Johnston, R.P., Hirschkron, R., Koch, C.C., Neitzel, R.E., and Vinson, P.W. (1978). Energy efficient engine: Preliminary design and integration study—final report. Nasa CR-135444. Sep. 1978. pp. 1-401.

Jorgensen, P.J., Wadsworth, M.E., and Cutler, I.B. (1961). Effects of water vapor on oxidation of silicon carbide. J. Am. Ceram. Soc. 44(6). pp. 248-261.

JT15D, Pratt Whitney Canada Retrieved Apr. 9, 2017, http://www.pwc.ca/en/engines/jt15d, 3 pages.

Judgement and Final Written Decision. U.S. Pat. No. 8,448,895, *General Electric Company*, Petitioner, v. *United Technologies Corporation*, Patent Owner, IPR2017-00425, Entered Jul. 2, 2018, 52 pages.

Judgement and Final Written Decision. U.S. Pat. No. 8,695,920, *General Electric Company*, Petitioner, v. *United Technologies Corporation*, Patent Owner, IPR2017-00428, Entered Dec. 19, 2017, 3 pages.

(56) References Cited

OTHER PUBLICATIONS

Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.

Kandebo, S.W. (1998). Geared-Turbofan engine design targets cost, complexity. Aviation Week & Space Technology, 148(8). p. 34-5.

Kandebo, S.W. (1998). Pratt Whitney launches geared turbofan engine. Aviation Week & Space Technology, 148(8). p. 32-4.

Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP. May 8-11, 2006. pp. 1-10.

Kasuba, R. and August, R. (1984). Gear mesh stiffness and load sharing in planetary gearing. American Society of Mechanical Engineers, Design Engineering Technical Conference, Cambridge, MA. Oct. 7-10, 1984. pp. 1-6.

Kerrebrock, J.L. (1977). Aircraft engines and gas turbines. Cambridge, MA: The MIT Press. p. 11.

Nelgaard, C. (2010). Gear up for the GTF. Aircraft Technology, 105. Apr.-May 2010. pp. 86, 88, 90, 92-95.

Knip, Jr., G. (1987). Analysis of an advanced technology subsonic turbofan incorporating revolutionary materials. NASA Technical Memorandum. May 1987. pp. 1-23.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Krantz, T.L. (1990). Experimental and analytical evaluation of efficiency of helicopter planetary stage. NASA Technical Paper. Nov. 1990. pp. 1-19.

Krauskopf, L. Shumaker, L. (2014). GE exec says avoided geared design in jet engine battle with Pratt. Reuters. Sep. 15, 2014. http://www.reuters.com/article/us-general-electric-united-tech-engine-idUSKBN0HA2H620140915.

Krenkel, W., Naslain, R., and Schneider, H. Eds. (2001). High temperature ceramic matrix composites pp. 224-229. Weinheim, DE: Wiley-VCH Verlag GmbH.

Kurzke, J. (2001). Gas Turb 9: A program to calculate design and off-design performance of gas turbines. Retrieved from: https://www.scribd.com/document/92384867/GasTurb9Manual.

Kurzke, J. (2008). Preliminary Design, Aero-engine design: From state of the art turbofans towards innovative architectures. pp. 1-72.

Kurzke, J. (2009). Fundamental differences between conventional and geared turbofans. Proceedings of ASME Turbo Expo: Power for Land, Sea, and Air. 2009, Orlando, Florida. pp. 145-153.

Kurzke, J. (2012). GasTurb 12: Design and off-design performance of gas turbines. Retrieved from: https://www.scribd.com/document/153900429/GasTurb-12.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Lau, K., Gu, C., and Hui, D. (2005). A critical review on nanotube and nanotube/nanoclay related polymer composite materials. Composites: Part B 37(2006) 425-436.

Leckie, F.A. and Dal Bello, D.J. (2009). Strength and stiffness of engineering systems. Mechanical Engineering Series. Springer. pp. 1-10, 48-51.

Leckie F.A., et al., "Strength and Stiffness of Engineering Systems," Mechanical Engineering Series, Springer, 2009, pp. 1-3.

Lee, K.N. (2000). Current status of environmental barrier coatings for Si-Based ceramics. Surface and Coatings Technology 133-134, 2000. pp. 1-7.

Levintan, R.M. (1975). Q-Fan demonstrator engine. Journal of Aircraft. Vol 12( 8). Aug. 1975. pp. 658-663.

Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.

Liebeck, R.H., Andrastek, D.A., Chau, J., Girvin, R., Lyon, R., Rawdon, B.K., Scott, P.W. et al. (1995). Advanced subsonic airplane design economics studies. NASA CR-195443. Apr. 1995. pp. 1-187.

Litt, J.S. (2018). Sixth NASA Glenn Research Center propulsion control and diagnostics (PCD) workshop. NASA/CP-2018-219891. Apr. 1, 2018. pp. 1-400.

Lord, W.K. (2000). P&W expectations. Quiet Aircraft Technology Workshop, Dallas, TX. Apr. 11-12, 2000. pp. 1-7.

Lord, W.K., MacMartin, D.G., and Tillman, T.G. (2000). Flow control opportunities in gas turbine engines. American Institute of Aeronautics and Astronautics. pp. 1-15.

Lynwander, P. (1983). Gear drive systems: Design and application. New York, New York: Marcel Dekker, Inc. pp. 145, 355-358.

Macisaac, B. and Langston, R. (2011). Gas turbine propulsion systems. Chichester, West Sussex: John Wiley & Sons, Ltd. pp. 260-265.

Mancuso, J.R. and Corcoran, J.P. (2003). What are the differences in high performance flexible couplings for turbomachinery? Proceedings of the Thirty-Second Turbomachinery Symposium. 2003. pp. 189-207.

Manual. Student's Guide to Learning SolidWorks Software. Dassault Systemes—SolidWorks Corporation. pp. 1-156.

Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.

Mattingly, J.D. (1996). Elements of gas turbine propulsion. New York, New York: McGraw-Hill, Inc. pp. 1-18, 60-62, 223-234, 462-479, 517-520, 757-767, and 862-864.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 668-670, 673-675, 682-685, 697-705, 726-727, 731-732, 802-805, 828-830 and appendices.

Mattingly, J.D. (1996). Elements of gas turbine propulsion. New York, New York: McGraw-Hill, Inc. pp. 1-18, 60-62, 85-87, 95-104, 121-123, 223-234, 242-245, 278-285, 303-309, 323-326, 462-479, 517-520, 563-565, 630-632, 673-675, 682-685, 697-699, 703-705, 802-805, 862-864, and 923-925.

Mattingly, J.D. (1996). Elements of gas turbine propulsion. New York, New York: McGraw-Hill, Inc. pp. 8-15.

Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.

Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.

Tsang D. (2011). Special report: The engine battle heats up (Update 1) Aspire Aviation. Retrieved Apr. 3, 2016 from: http://www.aspireaviation.com/2011/05/10/pw-purepower-engine-vs-cfm-leap-x/.

Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.

Tummers, B. (2006). DataThief III. Retreived from: https://datathief.org/DatathiefManual.pdf pp. 1-52.

"Turbofan engine JT8D cutaway model AE-06", Aero Train Corp, 2 pages. Retrieved Apr. 9, 2017 from: http://aerotraincorp.com.ae-06.php.

Turbomeca Aubisque. Jane's Aero-engines, Aero-engines—Turbofan. Nov. 2, 2009.

Turner, M. G., Norris, A., and Veres, J.P. (2004). High-fidelity three-dimensional simulation of the GE90. NASA/TM-2004-212981. pp. 1-18.

(56) References Cited

OTHER PUBLICATIONS

Type Certificate Data Sheet No. E6NE. Department of Transportation Federal Aviation Administration. Jun. 7, 2002. pp. 1-10.
U.S. Department of Transportation: Federal Aviation Administration Advisory Circular, Runway overrun prevention, dated: Nov. 6, 2007, p. 1-8 and Appendix 1 pp. 1-15, Appendix 2 pp. 1-6, Appendix 3 pp. 1-3, and Appendix 4 pp. 1-5.
U.S. Department of Transportation: Federal Aviation Administration Advisory Circular. Standard operating procedures for flight deck crewmembers, Dated: Feb. 27, 2003, p. 1-6 and Appendices.
U.S. Department of Transportation: Federal Aviation Administration Type Certificate Data Sheet No. E46NE, Jan. 23, 2012, p. 1-7.
U.S. Department of Transportation: Federal Aviation Administration Type Certificate Data Sheet No. E6WE. Dated: May 9, 2000. p. 1-9.
U.S. Appl. No. 11/832,107 dated Aug. 1, 2007, Engine Mounting Configuration for a Turbofan Gas Turbine Engine, 14 pages.
Vasudevan, A.K. and Petrovic, J.J. (1992). A comparative overview of molybedenum disilicide composites. Materials Science and Engineering, A155, 1992. pp. 1-17.
Warwick, G. (2007). Civil engines: Pratt Whitney gears up for the future with GTF. Flight International, Nov. 2007. Retrieved Jun. 14, 2016 from: https://www.flightglobal.com/news/articles/civil-engines-pratt-amp-whitney-gears-up-for-the-future-with-219989/.
Waters, M.H. and Schairer, E.T. (1977). Analysis of turbofan propulsion system weight and dimensions. NASA Technical Memorandum. Jan. 1977. pp. 1-65.
Web Article, GE Aviation, GEnx-28 first engine to test, Jan. 28, 2012, Retrieved from: http://www.geaviation.com/engines/commercial/genx/2b_fett.html, 1 page.
Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.
Wendus, B.E., Stark, D.F., Holler, R.P., and Funkhouse, M.E. (2003). Follow-on technology requirement study for advanced subsonic transport. Technical Report prepared for NASA. NASA/CR-2003-212467. Aug. 1, 2003. pp. 1-47.
Whitaker, R. (1982). ALF 502: plugging the turbofan gap. Flight International, p. 237-241, Jan. 30, 1982.
Wie, Y.S., Collier, F.S., Wagner, R.D., Viken, J.K., and Pfenniger, W. (1992). Design of a hybrid laminar flow control engine nacelle. AIAA-92-0400. 30th Aerospace Sciences Meeting Exhibit. Jan. 6-9, 1992. pp. 1-14.
Wikipedia. Stiffness. Retrieved Jun. 28, 2018 from: https://en.wikipedia.org/wiki/Stiffness.
Wikipedia. Torsion spring. Retreived Jun. 29, 2018 from: https://en.wikipedia.org/wiki/Torsion_spring.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Willis, W.S. (1979). Quiet clean short-haul experimental engine (QCSEE) final report. NASA/CR-159473 pp. 1-289.
Winn, A. (Ed). (1990). Wide Chord Fan Club. Flight International, 4217(137). May 23-29, 1990. pp. 34-38.
Wright, G.H. and Russell, J.G. (1990). The M.45SD-02 variable pitch geared fan engine demonstrator test and evaluation experience. Aeronautical Journal., vol. 84(836). Sep. 1980. pp. 268-277.
Xie, M. (2008). Intelligent engine systems: Smart case system. NASA/CR-2008-215233. pp. 1-31.
Xu, Y., Cheng, L., Zhang, L., Ying, H., and Zhou, W. (1999). Oxidation behavior and mechanical properties of C/SiC composites with Si—MoSi2 oxidation protection coating. J. of Mat. Sci. vol. 34. 1999. pp. 6009-6014.
Yazzie C., "CFM-56 turbofan jet engines", 2013, Retrieved Apr. 9, 2017 from: https://prezi.com/lqwqiuchmgd0/cfm-56-turbofan-jet-engines , 5 pages.
Zalud, T. (1998). Gears put a new spin on turbofan performance. Machine Design, 70(20), p. 104.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Zhao, J.C. and Westbrook, J.H. (2003). Ultrahigh-temperature materials for jet engines. MRS Bulletin. vol. 28(9). Sep. 2003. pp. 622-630.
2003 NASA seal/secondary air system workshop. (2003). NASA/CP-2004-212963/vol. 1. Sep. 1, 2004. pp. 1-408.
(2012). Gas Power Cycle—Jet Propulsion Technology, A case study. Machine Design Magazine. Nov. 5, 1998. Retrieved from: http://machinedesign.com/content/pw8000-0820.
About Gas Turb. Retrieved Jun. 26, 2018 from: http://gasturb.de/about-gasturb.html.
Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.
Aerospace Information Report. (2008). Advanced ducted propulsor in-flight thrust determination. SAE International AIR5450. Aug. 2008. p. 1-392.
Agarwal, B.D and Broutman, L.J. (1990). Analysis and performance of fiber composites, 2nd Edition. John Wiley Sons, Inc. New York: New York. pp. 1-11, 13-23, 26-33, 50-51, 56-58, 60-61, 64-71, 87-89, 324-329, 436-437.
Agma Standard (1997). Design and selection of components for enclosed gear drives. lexandria, VA: American Gear Manufacturers Association. pp. 1-48.
Agma Standard (1999). Flexible couplings- Mass elastic properties and other characteristics. Alexandria, VA: American Gear Manufacturers Association. pp. 1-46.
Agma Standard (2006). Design manual for enclosed epicyclic gear drives. Alexandria, VA: American Gear Manufacturers Association. pp. 1-104.
Ahmad, F. and Mizramoghadam, A.V. (1999). Single v. two stage high pressure turbine design of modern aero engines. ASME. Prestend at the International Gast Turbine Aeroengine Congress Exhibition. Indianapolis, Indiana. Jun. 7-10, 1999. pp. 1-9.
Amezketa, M., Iriarte, X., Ros, J., and Pintor, J. (2009). Dynamic model of a helical gear pair with backlash and angle-varying mesh stiffness. Multibody Dynamics 2009, ECCOMAS Thematic Conference. 2009. pp. 1-36.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Anderson, R.D. (1985). Advanced Propfan Engine Technology (APET) definition study, single and counter-rotation gearbox/pitch change mechanism design. NASA CR-168115. Jul. 1, 1985. pp. 1-289.
Avco Lycoming Divison. Alf 502L Maintenance Manual. Apr. 1981. pp. 1-118.
Aviadvigatel D-110. Jane's Aero-engines, Aero-engines—Turbofan. Jun. 1, 2010.
Awker, R.W. (1986). Evaluation of propfan propulsion applied to general aviation. NASA CR-175020. Mar. 1, 1986. pp. 1-140.
Baker, R.W. (2000). Membrane technology and applications. New York, NY: McGraw-Hill. pp. 87-153.
Baskharone E.A., "Principles of Turbomachinery in Air-Breathing Engines," Cambridge University Press, 2006, pp. 261-263.
Berton, J.J. (2002). Advanced engine cycles analyzed for turbofans with variable-area fan nozzles actuated by a shape memory alloy. Research and Technology 2001. pp. 1-3.
Berton, J.J. and Guynn, M.D. (2012). Multi-objective optimization of a turbofan for an advanced, single-aisle transport. NASA/TM-2012-217428. pp. 1-26.
Berton, J.J., et al., "An Analytical Assessment of NASA's N+1 Subsonic Fixed Wing Project Noise Goal", NASA/ TM-2010-216085, the United States, AIAA, Feb. 1, 2010, 25 pages.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.

(56) References Cited

OTHER PUBLICATIONS

Bloomer, H.E. and Loeffler, I.J. (1982). QCSEE over-the-wing engine acoustic data. NASA-TM-82708. May 1, 1982. pp. 1-558.
Bloomer, H.E. and Samanich, N.E. (1982). QCSEE under-the-wing engine acoustic data. NASA-TM-82691. May 1, 1982. pp. 1-28.
Bloomer, H.E. and Samanich, N.E. (1982). QCSEE under-the-wing enging-wing-flap aerodynamic profile characteristics. NASA-TM-82890. Sep. 1, 1982. pp. 1-48.
Bloomer, H.E., Loeffler, I.J., Kreim, W.J., and Coats, J.W. (1981). Comparison of NASA and contractor reslts from aeroacoustic tests of Qcsee Otw engine. NASA Technical Memorandum 81761. Apr. 1, 1981. pp. 1-30.
Boggia, S. and Rud, K.. (2005). Intercooled recuperated gas turbine engine concept. 41st AIAA/ASME/SAE/ASEE Joint Propulsion Conference & Exhibit. Tuscon, Arizona. Jul. 10-13, 2005. pp. 1-11.
Bornstein, N. (1993). Oxidation of advanced intermetallic compounds. Journal de Physique IV, 1993, 03 (C9), pp. C9-367-C9-373.
Brennan, P.J. and Kroliczek, E.J. (1979). Heat pipe design handbook. Prepared for National Aeronautics and Space Administration by B & K Engineering, Inc. Jun. 1979. pp. 1-348.
Brines, G.L. (1990). The turbofan of tomorrow. Mechanical Engineering: The Journal of the American Society of Mechanical Engineers, 108(8), 65-67.
Brochure, LEAP: The Power of the Future, 2013, Retrieved from: http://www.cfmaeroengines.com, 15 pages.
Bucknell, R.L. (1973). Influence of fuels and lubricants on turbine engine design and performance, fuel and lubircant analyses. Final Technical Report, Mar. 1971-Mar. 1973. pp. 1-252.
Bunker, R.S. (2005). A review of shaped hole turbine film-cooling technology. Journal of Heat Transfer vol. 127. Apr. 2005. pp. 441-453.
Carney, K., Pereira, M. Revilock, and Matheny, P. (2003). Jet engine fan blade containment using two alternate geometries. 4th European LS-DYNA Users Conference. pp. 1-10.
CFM56 Engine, Delta TechOps, Retrieved Apr. 9, 2017 from: http://www.deltatechops.com/mro-capabilites/view/category/cfm56, 2 pages.
Chapman J.W., et al., "Control Design for an Advanced Geared Turbofan Engine", AIAA Joint Propulsion Conference 2017, Jul. 10, 2017-Jul. 12, 2017, Atlanta, GA, pp. 1-12.
Cheryan, M. (1998). Ultrafiltration and microfiltration handbook. Lancaster, PA: Tecnomic Publishing Company, Inc. pp. 171-236.
Ciepluch, C. (1977). Quiet clean short-haul experimental engine (QCSEE) under-the-wing (UTW) final design report. Prepared for Nasa. NASA-CP-134847. Retreived from: https://ntrs.nasa.gov/archive/nasa/casi.ntrs.nasa. gov/19800075257.pdf.
Clarke, D.R. and Levi, C.G. (2003). Materials design for the next generation thermal barrier coatings. Annual. Rev. Mater. Res. vol. 33. 2003. pp. 383-417.
Coy, Peter. The little gear that could reshape the jet engine: A simple idea's almost 30-year, $10 billion journey to the aircraft mainstream. Bloomberg Business. Oct. 15, 2015. p. 1-4.
Cramoisi, G. Ed. (2012). Death in the Potomac: The crash of Air Florida Flight 90. Air Crash Investigations. Accident Report NTSB/AAR-82-8. p. 45-47.
Cusick, M. (1981). Avco Lycoming's ALF 502 high bypass fan engine. Society of Automotive Engineers, Inc. Business Aircraft Meeting & Exposition. Wichita, Kansas. Apr. 7-10, 1981. pp. 1-9.
Daggett, D.L., Brown, S.T., and Kawai, R.T. (2003). Ultra-efficient engine diameter study. NASA/CR-2003-212309. May 2003. pp. 1-52.
Dalton, III., W.N. (2003). Ultra high bypass ratio low noise engine study. NASA/CR-2003-212523. Nov. 2003. pp. 1-187.
Daly, M. Ed. (2008). Jane's Aero-Engine. Issue Twenty-three. Mar. 2008. p. 707-712.
Daly, M. Ed. (2010). Jane's Aero-Engine. Issue Twenty-seven. Mar. 2010. p. 633-636.

Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of_gears.
Darrah, S. (1987). Jet fuel deoxygenation. Interim Report for Period Mar. 1987-Jul. 1988. pp. 1-22.
Dassault Falcon 900EX Easy Systems Summary. Retrieved from: http://www.smartcockpit.com/docs/F900EX-Engines.pdf pp. 1-31.
Datasheet. CF6-80C2 high-bypass turbofan engines. Retreived from https://geaviation.com/sites/default/files/datasheet-CF6-80C2.pdf.
Datasheet. CFM56-5B For the Airbus A320ceo family and CFM56-7B for the Boeing 737 family. https://www.cfmaeroengines.com/.
Datasheet. Genx™ high bypass turbofan engines. Retreived from: https://www.geaviation.com/sites/default/files/datasheet-genx.pdf.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Davis, D.G.M. (1973). Variable-pitch fans: Progress in Britain. Flight International. Apr. 19, 1973. pp. 615-617.
Decision, *General Electric Company*, Petitioner, v. *United Technologies Corporation*, Patent Owner, IPR2017-00425, U.S. Pat. No. 8,448,895 B2, Entered Jul. 3, 2017, pp. 1-29.
Decision. *General Electric Company*, Petitioner, v. *United Technologies Corporation*, Patent Owner. IPR2017-00428. U.S. Pat. No. 8,695,920 B2. Entered Jun. 26, 2017. pp. 1-21.
Decision. *General Electric Company*, Petitioner, v. *United Technologies Corporation*, Patent Owner. IPR2017-00431. U.S. Pat. No. 8,695,920 B2. Entered Jun. 26, 2017. pp. 1-20.
Decision Institution of Inter Partes Review, *General Electric Co.*, Petitioner v. *United Technologies Corp.*, Patent Owner, IPR2016-00531, U.S. Pat. No. 8,511,605, Entered Jun. 30, 2016, pp. 1-16.
Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.
Declaration of Dr. Magdy Attia, In re U.S. Pat. No. 8,313,280, Executed Oct. 21, 2016, pp. 1-88.
Declaration of Dr. Magdy Attia, In re U.S. Pat. No. 8,517,668, Executed Dec. 8, 2016, pp. 1-81.
Declaration of John Eaton, Ph.D. In re U.S. Pat. No. 8,689,568, Executed Mar. 28, 2016, pp. 1-87.
Declaration of Reza Abhari, In re U.S. Pat. No. 8,448,895, Executed Nov. 28, 2016, pp. 1-81.
Declaration of Reza Abhari. In re U.S. Pat. No. 8,695,920, claims 1-4, 7-14, 17 and 19, Executed Nov. 29, 2016, pp. 1-102.
Declaration of Reza Abhari. In re U.S. Pat. No. 8,695,920. Executed Nov. 30, 2016, pp. 1-67.
Declaration of Reza Abhari, Ph.D. in connection with the petition for inter partes review for U.S. Pat. No. 8,511,605 (challenged claims 1,2, and 7-11) executed Jan. 12, 2016, 61 pages.
Declaration of Reza Abhari, Ph.D. in connection with the petition for inter partes review for U.S. Pat. No. 8,511,605 (challenged claims 1-6 and 12-16) executed Jan. 12, 2016, 59 pages.
Declaration of Reza Abhari, Ph.D. In re U.S. Pat. No. 8,844,265, Executed Jun. 28, 2016, pp. 1-91.
Defeo, A. and Kulina, M. (1977). Quiet clean short-haul experimental engine (QCSEE) main reduction gears detailed design final report. Prepared for NASA. NASA-CR-134872. Jul. 1977. pp. 1-157.
Diagram of Prior Art V2500 and PW4090 Engines, 1 page.
Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.
Disclaimer in Patent Under 37 CFR 1.321(a) for U.S. Pat. No. 8,695,920, 4 pages.
Drago, R.J. (1974). Heavy-lift helicopter brings up drive ideas. Power Transmission Design. Mar. 1987. pp. 1-15.
Drago, R.J. and Margasahayam, R.N. (1987). Stress analysis of planet gears with integral bearings; 3D finite-element model development and test validation. 1987 MSC Nastran World Users Conference. Los Angeles, CA. Mar. 1987. pp. 1-14.

(56) References Cited

OTHER PUBLICATIONS

Dudley, D.W., Ed. (1954). Handbook of practical gear design. Lancaster, PA: Technomic Publishing Company, Inc. pp. 3.96-102 and 8.12-18.
Dudley, D.W., Ed. (1962). Gear handbook. New York, NY: McGraw-Hill. pp. 14-17 (TOC, Preface, and Index).
Dudley, D.W., Ed. (1962). Gear handbook. New York, NY: McGraw-Hill. pp. 3.14-18 and 12.7-12.21.
Dudley, D.W., Ed. (1994). Practical gear design. New York, NY: McGraw-Hill. pp. 119-124.
Edkins, D.P., Hirschkron, R., and Lee, R. (1972). TF34 turbofan quiet engine study. Final Report prepared for NASA. NASA-CR-120914. Jan. 1, 1972. pp. 1-99.
Edwards, T. and Zabarnick, S. (1993). Supercritical fuel deposition mechanisms. Ind. Eng. Chem. Res. vol. 32. 1993. pp. 3117-3122.
El-Sayad, A.F. (2008). Aircraft propulsion and gas turbine engines. Boca Raton, FL: CRC Press. pp. 215-219 and 855-860.
Engber, M., Klaus, R., Ardey, S., Gier, J., and Waschka, W. (2007). Advanced technologies for next generation regional jets—Survey of research activities at MTU Aero Engines. Proceedings: XVIII International Symposium on Air Breathing Engines (ISABE). 18th ISABE Conference. Beijing, China. Sep. 2-7, 2007. pp. 1-11.
"Epicyclic Gearing", (Oct. 23, 2007), In Wikipedia, The Free Encyclopedia, Retrieved 22:55, Sep. 6, 2017, from waybackmachine.com https://web.archive.org/web/20071023023829/en.wikipedia.org/wiki/epicycli-c_gearing, 3 pages.
European Search Report for Application No. EP12196028.0 dated Jun. 23, 2014, 6 pages.
European Search Report for Application No. EP12197866 dated Aug. 20, 2014, 7 pages.
European Search Report for Application No. EP12863186.8 dated Oct. 29, 2014, 6 pages.
European Search Report for Application No. EP15171345 dated Oct. 9, 2015.
European Search Report for Application No. EP20152745.4 dated Jun. 4, 2020.
Faghri, A. (1995). Heat pipe and science technology. Washington, D.C.: Taylor Francis. pp. 1-60.
Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.
File History for U.S. Appl. No. 12/131,876.
Final Written Decision *General Electric Company.*, Petitioner, v. *United Technologies Corp.*, Patent Owner, IPR2016-00531, U.S. Pat. No. 8,511,605 82, Entered Jun. 26, 2017, pp. 1-35.
Final Written Decision *General Electric Company.*, Petitioner, v. *United Technologies Corp.*, Patent Owner, IPR2016-00533, U.S. Pat. No. 8,511,605 82, Entered Jun. 26, 2017, pp. 1-19.
Final Written Decision *General Electric Company*, Petitioner, v. *United Technologies Corporation*, Patent Owner, IPR2017-00428, U.S. Pat. No. 8,695,920, Entered Jun. 22, 2018, pp. 1-40.
Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.
Fledderjohn, K.R. (1983). The TFE731-5: Evolution of a decade of business jet service. SAE Technical Paper Series. Business Aircraft Meeting Exposition. Wichita, Kansas. Apr. 12-15, 1983. pp. 1-12.
Frankenfeld, J.W. and Taylor, W.F. (1980). Deposit fromation from deoxygenated hydrocarbons. 4. Studies in pure compound systems. Ind. Eng. Chem., Prod. Res. Dev., vol. 19(1). 1978. pp. 65-70.
Garret TFE731 Turbofan Engine (CAT C). Chapter 79: Lubrciation System. TTFE731 Issue 2. 2010. pp. 1-24.
Gates, D. Bombardier flies at higher market. Seattle Times. Jul. 13, 2008. pp. C6.
GE Reports (2009). GE's breakthrough GEnx debuts at the Paris Air Show. Retrieved Jun. 6, 2009 from: http://www.gereports.com/ges-breakthrough-genx-debuts-at-the-paris-air-show/.

Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155, 1992. pp. 147-158.
Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.
Gliebe, P.R., Ho, P.Y., and Mani, R. (1995). UHB engine fan and broadband noise reduction study. NASA CR-198357. Jun. 1995. pp. 1-48.
Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.
Gray, D.E. (1978). Energy efficient engine preliminary design and integration studies. NASA-CP-2036-PT-1. Nov. 1978. pp. 89-110.
Gray, D.E. (1978). Energy efficient engine preliminary design and integration studies. Prepared for NASA. NASA CR-135396. Nov. 1978. pp. 1-366.
Gray, D.E. and Gardner, W.B. (1983). Energy efficient engine program technology benefit/cost study—vol. 2. NASA CR-174766. Oct. 1983. pp. 1-118.
Greitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794/vol. 1. pp. 1-187.
Griffiths, B. (2005). Composite fan blade containment case. Modern Machine Shop. Retrieved from: http://www.mmsonline.com/articles/composite-fan-blade-containment-case pp. 1-4.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL. May 1-4, 1994. pp. 1-10.
Guha, "Optimum Fan Pressure Ratio for Bypass Engines with Separate or Mixed Exhaust Streams", Journal of Propulsion and Power, vol. 17, No. 5. Sep.-Oct. 2001, pp. 1117-1122, [retrieved on Aug. 21, 2013]. Retrieved from the Internet: http://www.facweb.iitkgp,ernet.in/.about.aguha/research/AIAA2001- .pdf>entire document.
Gunston, B. (Ed.) (2000). Jane's aero-engines, Issue seven. Coulsdon, Surrey, UK: Jane's Information Group Limited. pp. 510-512.
Gunston, B. (Ed.)(2000). Jane's aero-engines. Jane's Information Group Inc. VA: Alexandria. Issue Seven pp. 1-47 and 510-512.
Gunston B., "Jane's Aero-engines", Issue Seven, Janes Information Group Inc, Alexandria, Virgina, 2000, pp. 1-47, 61, 464-512.
Guynn, M. D., Berton, J.J., Fisher, K. L., Haller, W.J., Tong, M. T., and Thurman, D.R. (2009). Analysis of turbofan design options for an advanced single-aisle transport aircraft. American Institute of Aeronautics and Astronautics. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.
Haldenbrand, R. and Norgren, W.M. (1979). Airesearch QCGAT program [quiet clean general aviation turbofan engines]. NASA-CR-159758. pp. 1-199.
Hall, C.A. and Crichton, D. (2007). Engine design studies for a silent aircraft. Journal of Turbomachinery, 129, 479-487.
Han, J., Dutta, S., and Ekkad, S.V. (2000). Gas turbine heat transfer and cooling technology. New York, NY: Taylor Francis. pp. 1-25, 129-157, and 160-249.
Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37 (20), 1821-1837.
Hazlett, R.N. (1991). Thermal oxidation stability of aviation turbine fuels. Philadelphia, PA: ASTM. pp. 1-163.

(56) References Cited

OTHER PUBLICATIONS

Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.

Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14, 1993. pp. 1-30.

Heingartner, P., MBA, D., Brown, D. (2003). Determining power losses in the helical gear mesh; Case Study. ASME 2003 Design Engineering Technical Conferences. Chicago, IL. Sep. 2-6, 2003. pp. 1-7.

Hemighaus, G., Boval, T., Bacha, J., Barnes, F., Franklin, M., Gibbs, L., . . . Morris, J. (2007). Aviation fuels: Techincal review. Chevron Products Company. pp. 1-94. Retrieved from: https://www.cgabusinessdesk.com/document/aviation_tech_review.pdf.

Hendricks, E.S. and Tong, M.T. (2012). Performance and weight estimates for an advanced open rotor engine. NASA/TM-2012-217710. pp. 1-13.

Hess, C. (1998). Pratt Whitney develops geared turbofan. Flug Revue 43(7). Oct. 1998.

Hill, P.G., Peterson, C.R. (1965). Mechanics and thermodynamics of propulsion. Addison-Wesley Publishing Company, Inc. pp. 307-308.

Hill, P.G., Peterson, C.R. (1992). Mechanics and thermodynamics of propulsion, 2nd Edition. Addison-Wesley Publishing Company, Inc. pp. 400-406.

Holcombe, V. (2003). Aero-Propulsion Technology (APT) task V low noise ADP engine definition study. NASA CR-2003-212521. Oct. 1, 2003. pp. 1-73.

Honeywell Learjet 31 and 35/36 TFE731-2 to 2C Engine Upgrade Program. Sep. 2005. pp. 1-4.

Honeywell LF502. Jane's Aero-engines, Aero-engines—Turbofan. Feb. 9, 2012.

Honeywell LF502. Jane's Aero-engines, Aero-engines—Turbofan. Aug. 17, 2016.

Honeywell LF507. Jane's Aero-engines, Aero-engines—Turbofan. Feb. 9, 2012.

Honeywell Sabreliner 65 TFE731-3 to -3D Engine Upgrade Program. Oct. 2005. pp. 1-4.

Honeywell TFE731. Jane's Aero-engines, Aero-engines—Turbofan. Jul. 18, 2012.

Honeywell TFE731 Pilot Tips. pp. 1-143.

Honeywell TFE731-5AR to -5BR Engine Conversion Program. Sep. 2005. pp. 1-4.

Horikoshi, S. and Serpone, N. (2013). Introduction to nanoparticles. Microwaves in nanoparticle synthesis. Wiley-VCH Verlag GmbH Co. KGaA. pp. 1-24.

Howard, D.F. (1976). QCSEE preliminary under the wing flight propulsion system analysis report. NASA CR-134868. Feb. 1, 1976. pp. 1-260.

Howe, D.C. and Wynosky, T.A. (1985). Energy efficient engine program advanced turbofan nacelle definition study. NASA CR-174942. May 1, 1985. pp. 174.

Howe, D.C., and Wynosky, T.A. (1985). Energy efficient engine program advanced turbofan nacelle definition study. NASA-CR-174942. May 1985. pp. 1-60.

Howe, D.C., and Wynosky, T.A. (1985). Energy efficient engine program advanced turbofan nacelle definition study. NASA-CR-174942. May 1985. University of Washington dated Dec. 13, 1990. pp. 1-14.

Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.

Huff, D. (2006). Technologies for aircraft noise reduction. NASA Glenn Research Center. West Park Airport Committee Meeting. Feb. 16, 2006. pp. 1-23.

Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.

Hughes, C. (2010). Geared turbofan technology. NASA Environmentally Responsible Aviation Project. Green Aviation Summit. NASA Ames Research Center. Sep. 8-9, 2010. pp. 1-8.

International Preliminary Report on Patentability for PCT Application No. PCT/US2012/072271 dated on Jul. 10, 2014, 7 pages.

Mattingly J.D., "Aircraft Engine Design," American Institute of Aeronautics and Astronautics Inc, 2nd Edition, Jan. 2002, pp. 292-322.

Mavris, D.N., Schutte, J.S. (2016). Application of deterministic and probabilistic system design methods and enhancements of conceptual design tools for ERA project final report. NASA/CR-2016-219201. May 1, 2016. pp. 1-240.

McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.

McCracken, R.C. (1979). Quiet short-haul research aircraft familiarization document. NASA-TM-81149. Nov. 1, 1979. pp. 1-76.

McCune, M.E. (1993). Initial test results of 40,000 horsepower fan drive gear system for advanced ducted propulsion systems. AIAA 29th Joint Conference and Exhibit. Jun. 28-30, 1993. pp. 1-10.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Meier N. (2005) Civil Turbojet/Turbofan Specifications. Retrieved from http://jet-engine.net/civtfspec.html.

Merriam-Webster's collegiate dictionary, 10th Ed. (2001). p. 1125-1126.

Merriam-Webster's collegiate dictionary, 11th Ed. (2009). p. 824.

Meyer, A.G. (1988). Transmission development of TEXTRON Lycoming's geared fan engine. Technical Paper. Oct. 1988. pp. 1-12.

Michel, U. (2011). The benefits of variable area fan nozzles on turbofan engines. AIAA 2011-226. Jan. 4-7, 2011. pp. 1-17.

Middleton, P. (1971). 614: VFW's jet feederliner. Flight International, Nov. 4, 1971. p. 725, 729-732.

Misel, O.W. (1977). QCSEE main reduction gears test program. NASA CR-134669. Mar. 1, 1977. pp. 1-222.

Moxon, J. How to save fuel in tomorrow's engines. Flight International. Jul. 30, 1983. 3873(124). pp. 272-273.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Munt, R. (1981). Aircraft technology assessment: Progress in low emissions engine. Technical Report. May 1981. pp. 1-171.

Nagendra S., et al., "Optimal rapid multidisciplinary response networks: RAPIDDISK," Structural and Multidisciplinary Optimization, Springer, Berlin, DE, vol. 29, No. 3, Mar. 1, 2005, pp. 213-231.

Nanocor Technical Data for Epoxy Nanocomposites using Nanomer 1.30E Nanoclay. Nnacor, Inc. Oct. 2004.

NASA Conference Publication. (1978). CTOL transport technology. NASA-CP-2036-PT-1. Jun. 1, 1978. pp. 1-531.

NASA Conference Publication. Quiet, powered-lift propulsion. Cleveland, Ohio. Nov. 14-15, 1978. pp. 1-420.

Neitzel, R., Lee, R., and Chamay, A.J. (1973). Engine and installation preliminary design. Jun. 1, 1973. pp. 1-333.

Neitzel, R.E., Hirschkron, R. and Johnston, R.P. (1976). Study of unconventional aircraft engines designed for low energy consumption. NASA-CR-135136. Dec. 1, 1976. pp. 1-153.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 1986. pp. 1-101.

Norton, M. and Karczub, D. (2003). Fundamentals of noise and vibration analysis for engineers. Press Syndicate of the University of Cambridge. New York: New York. p. 524.

(56) References Cited

OTHER PUBLICATIONS

Notice of Opposition for European Patent No. 2610462 (12197866.2) by Safran Aircraft Engines dated Dec. 17, 2021. [with English translation].
Notice of Opposition to Patent No. EP2610460, United Technologies Corporation opposed by SNECMA dated Apr. 27, 2016, 58 pages.
Oates, G.C. (Ed). (1989). Aircraft propulsion systems and technology and design. Washington, D.C.: American Institute of Aeronautics, Inc. pp. 341-344.
Parametric study of STOL short-haul transport engine cycles and operational techniques to minimize community noise impact. NASA-CR-114759. Jun. 1, 1974. pp. 1-397.
Parker, R.G. and Lin, J. (2001). Modeling, modal properties, and mesh stiffness variation instabilities of planetary gears. Prepared for NASA. NASA/CR-2001-210939. May 2001. pp. 1-111.
Patent Owner's Preliminary Response in U.S. Pat. No. 8,695,920, *General Electric Company*, Petitioner, v. *United Technologies Corp.*, Patent Owner: IPR2017-00428, Entered Apr. 10, 2017. pp. 1-36.
Patent Owner's Response to Petition for Inter Partes Review of U.S. Pat. No. 8,695,920, *General Electric Company*, Petitioner, v. *United Technologies Corporation*, Patent Owner: IPR2017-00428, Filed Sep. 8, 2017, 54 pages.
Patentee's Request to Notice of Opposition to U.S. Pat. No. 2610460, United Technologies Corporation opposed by Safran Aircraft Engines dated Oct. 17, 2016, 22 pages.
Petition for Inter Partes Review of U.S. Pat. No. 8,511,605, Claims 1, 2, and 7-11. *General Electric Company*, Petitioner v. *United Technologies Corporation*, Patent Owner, Filed Jan. 29, 2016, 51 pages.
Petition for Inter Partes Review of U.S. Pat. No. 8,511,605, Claims 1-6 and 12-16, *General Electric Company*, Petitioner v. *United Technologies Corporation*, Patent Owner: Filed Jan. 29, 2016, 49 pages.
Petrovic, J.J., Castro, R.G., Vaidya, R.U., Peters, M.I., Mendoza, D., Hoover, R.C., and Gallegos, D. E. (2001). Molybdenum disilicide materials for glass melting sensor sheaths. Ceramic Engineering and Science Proceedings. vol. 22(3). 2001. pp. 59-64.
Pratt & Whitney, JT3D/TF33. www.All-Aero.com. Retrieved Apr. 9, 2017 from http://all-aero.com/index.php/contactus/64-engines-power/13428-pratt-whitney-jt3d-tf33 , 3 pages.
Preliminary Observations by the Board for European Patent Application No. EP12196028.0 dated Jul. 23, 2020.
Press release. The GE90 engine. Retreived from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old.
Product Brochure. Garrett TFE731. Allied Signal. Copyright 1987. pp. 1-24.
Propulsion Systems: Basic concepts. Jun. 20, 2003. Retrieved from: https://web.archive.org/web/20030620224519/ http://adg.stanford.edu/aa241/propulsion/propulsionintro.html.
Pyrograf-III Carbon Nanofiber. Product guide. Retrieved Dec. 1, 2015 from: http://pyrografproducts.com/Merchant5/merchant.mvc?Screen=cp_nanofiber.
QCSEE ball spline pitch-change mechanism whirligig test report. (1978). NASA-CR-135354. Sep. 1, 1978. pp. 1-57.
QCSEE hamilton standard cam/harmonic drive variable pitch fan actuation system derail design report. (1976). NASA-CR-134852. Mar. 1, 1976. pp. 1-172.
QCSEE main reduction gears bearing development program final report. (1975). NASA-CR-134890. Dec. 1, 1975. pp. 1-41.
QCSEE over-the-wing final design report. (1977). NASA-CR-134848. Jun. 1, 1977. pp. 1-460.
QCSEE over-the-wing propulsion system test report vol. III—mechanical performance. (1978). NASA-CR-135325. Feb. 1, 1978. pp. 1-112.

QCSEE Preliminary analyses and design report. vol. 1. (1974). NASA-CR-134838. Oct. 1, 1974. pp. 1-337.
QCSEE preliminary analyses and design report. vol. II. (1974). NASA-CR-134839. Oct. 1, 1974. pp. 340-630.
QCSEE the aerodynamic and mechanical design of the QCSEE under-the-wing fan. (1977). NASA-CR-135009. Mar. 1, 1977. pp. 1-137.
QCSEE the aerodynamic and preliminary mechanical design of the QCSEE OTW fan. (1975). NASA-CR-134841. Feb. 1, 1975. pp. 1-74.
QCSEE under-the-wing engine composite fan blade design. (1975). NASA-CR-134840. May 1, 1975. pp. 1-51.
QCSEE under-the-wing engine composite fan blade final design test report. (1977). NASA-CR-135046. Feb. 1, 1977. pp. 1-55.
QCSEE under-the-wing engine composite fan blade preliminary design test report. (1975). NASA-CR-134846. Sep. 1, 1975. pp. 1-56.
QCSEE under-the-wing engine digital control system design report. (1978). NASA-CR-134920. Jan. 1, 1978. pp. 1-309.
Quiet clean general aviation turbofan (QCGAT) technology study final report vol. I. (1975). NASA-CR-164222. Dec. 1, 1975. pp. 1-186.
Ramsden, J.M. (Ed). (1978). The new European airliner. Flight International, 113(3590). Jan. 7, 1978. pp. 39-43.
Ratna, D. (2009). Handbook of thermoset resins. Shawbury, UK: iSmithers. pp. 187-216.
Rauch, D. (1972). Design study of an air pump and integral lift engine ALF-504 using the Lycoming 502 core. Prepare for NASA. Jul. 1972. pp. 1-182.
Read, B. (2014). Powerplant revolution. AeroSpace. May 2014. pp. 28-31.
Reshotko, M., Karchmer, A., Penko, P.F. and McArdle, J.G. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.
Response to Groups for Appeal in European Patent No. EP2610460 by Safran Aircraft Engines dated Sep. 5, 2018.
Rethinking jet engines to make commercial aviation less of a threat to the climate (and the human respiratory system). Fortune. Retrieved Sep. 29, 2016 from: http://beta.fortune.com/change-the-world/united-technologies-8.
Reynolds, C.N. (1985). Advanced prop-fan engine technology (APET) single- and counter-rotation gearbox/pitch change mechanism. Prepared for NASA. NASA CR-168114 (vol. I). Jul. 1985. pp. 1-295.
Riegler, C., and Bichlmaier, C. (2007). The geared turbofan technology—Opportunities, challenges and readiness status. Porceedings CEAS. Sep. 10-13, 2007. Berlin, Germany. pp. 1-12.
Rolls-Royce M45H. Jane's Aero-engines, Aero-engines—Turbofan. Feb. 24, 2010.
Rolls-Royce RB211022 turbofan engine, cutaway. National Air and Space Museum, 5 pages, Retrieved Apr. 9, 2017 from: https://airandspace.si.edu/collection-objects/rolls-royce-rb211-22-turbofan-engine-cutaway.
Rotordynamic instability problems in high-performance turbomachinery. (1986). NASA conference publication 2443. Jun. 2-4, 1986.
Roux, E. (2007). Turbofan and turbojet engines database handbook. Editions Elodie Roux. Blagnac: France. pp. 1-595.
Salemme, C.T. and Murphy, G.C. (1979). Metal spar/superhybrid shell composite fan blades. Prepared for NASA. NASA-CR-159594. Aug. 1979. pp. 1-127.
Sargisson, D.F. (1985). Advanced propfan engine technology (APET) and single-rotation gearbox/pitch change mechanism. NASA Contractor Report—168113. R83AEB592. Jun. 1, 1985. pp. 1-476.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.

(56) References Cited

OTHER PUBLICATIONS

Seader, J.D. and Henley, E.J. (1998). Separation process principles. New York, NY: John Wiley & Sons, Inc. pp. 722-726 and 764-771.

Sessions R., "Turbo Hydra-Malic 350 Handbook", 1985, The Berkley Publishing Group, pp. 24-25.

Shah, D.M. (1992). MoSi2 and other silicides as high temperature structural materials. Superalloys 1992. The Minerals, Metals, Materials Society. pp. 409-422.

Shapiro J., "Green Technology: Jets Gear up to Fly Greener", Machine Design, Jun. 19, 2008, pp. 1-6.

Shorter Oxford English Dictionary, 6th Edition. (2007), vol. 2, N-Z, pp. 1888.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Singh, A. (2005). Application of a system level model to study the planetary load sharing behavior. Jounal of Mechanical Design. vol. 127. May 2005. pp. 469-476.

Singh, B. (1986). Small engine component technology (SECT) study. NASA CR-175079. Mar. 1, 1986. pp. 1-102.

Singh, R. and Houser, D.R. (1990). Non-linear dynamic analysis of geared systems. NASA-CR-180495. Feb. 1, 1990. pp. 1-263.

Smith, C.E., Hirschkron, R., and Warren, R.E. (1981). Propulsion system study for small transport aircraft technology (STAT). Final report. NASA-CR-165330. May 1, 1981. pp. 1-216.

Smith-Boyd, L. and Pike, J. (1986). Expansion of epicyclic gear dynamic analysis program. Prepared for NASA. NASA CR-179563. Aug. 1986. pp. 1-98.

Sowers, H.D. and Coward, W.E. (1978). QCSEE over-the-wing (OTW) engine acuostic design. NASA-CR-135268. Jun. 1, 1978. pp. 1-52.

Spadaccini, L.J., and Huang, H. (2002). On-line fuel deoxygenation for coke suppression. ASME, Jun. 2002. pp. 1-7.

Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.

Summons to Attend Oral Proceedings for European Patent Application No. EP12863186.8 dated Jul. 29, 2019.

Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.

Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.

Sutliff, D. (2005). Rotating rake turbofan duct mode measurement system. NASA TM-2005-213828. Oct. 1, 2005. pp. 1-34.

Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.

Sweetman, B. and Sutton, O. (1998). Pratt Whitney's surprise leap. Interavia Business & Technology, 53.621, p. 25.

Taylor, W.F. (1974). Deposit formation from deoxygenated hydrocarbons. I. General features. Ind. Eng. Chem., Prod. Res. Develop., vol. 13(2). 1974. pp. 133-138.

Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.

Taylor, W.F. and Frankenfeld, J.W. (1978). Deposit fromation from deoxygenated hydrocarbons. 3. Effects of trace nitrogen and oxygen compounds. Ind. Eng. Chem., Prod. Res. Dev., vol. 17(1). 1978. pp. 86-90.

Technical Data. Teflon. WS Hampshire Inc. Retrieved from: http://catalog.wshampshire.com/Asset/psg_teflon_ptfe.pdf.

Technical Report. (1975). Quiet Clean Short-haul Experimental Engine (QCSEE) UTW fan preliminary design. NASA-CR-134842. Feb. 1, 1975. pp. 1-98.

Technical Report. (1977). Quiet Clean Short-haul Experimental Engine (QCSEE) Under-the-Wing (UTW) final design report. NASA-CR-134847. Jun. 1, 1977. pp. 1-697.

The Economist., "Flying's New Gear," Retrieved from: https://www.economist.com/science-and-technology/2015/12/30/ftyings-new-gear, Jan. 2, 2016, 3 pages.

Thulin, R.D., Howe, D.C., and Singer, I.D. (1982). Energy efficient engine: High pressure turbine detailed design report. Prepared for NASA. NASA CR-165608. pp. 1-178.

\* cited by examiner

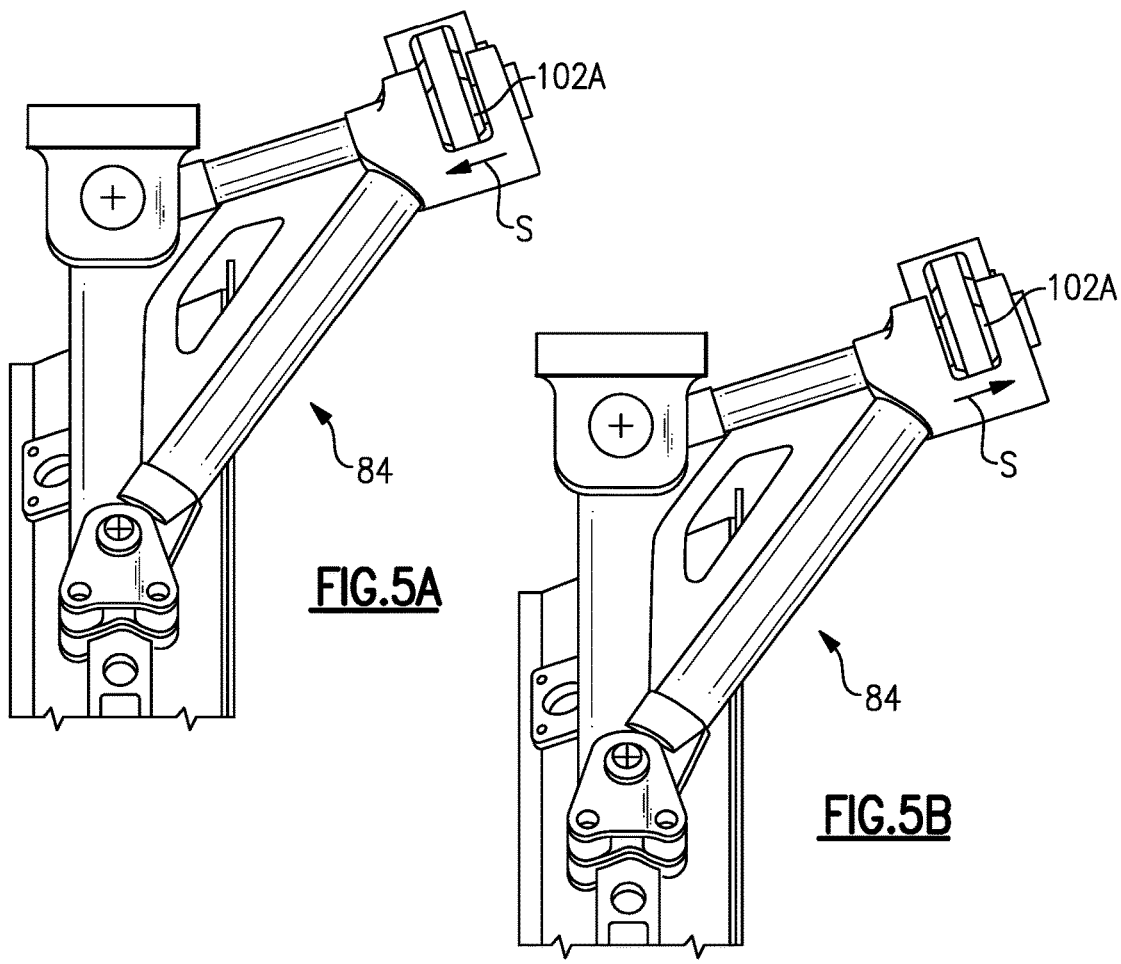
FIG.5A
FIG.5B
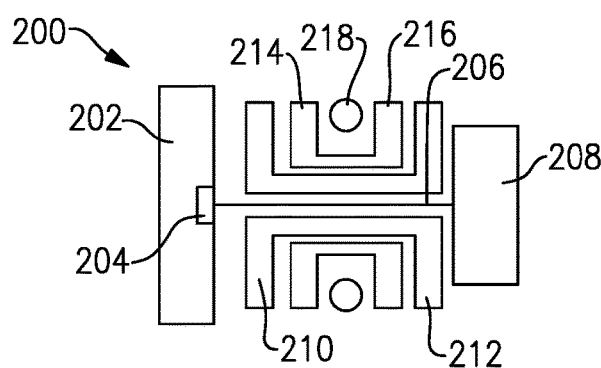
FIG.6
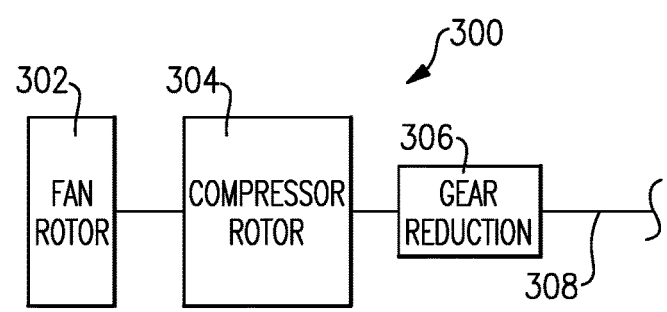
FIG.7

ENGINE MOUNT SYSTEM FOR A GAS TURBINE ENGINE

CROSS-REFERENCE TO RELATED APPLICATION

The present disclosure is a continuation of U.S. patent application Ser. No. 17/395,553, filed Aug. 6, 2021, which is a continuation of U.S. patent application Ser. No. 16/405,149, filed May 7, 2019, which is a continuation of U.S. patent application Ser. No. 15/173,288, filed Jun. 3, 2016, which is a continuation of U.S. patent application Ser. No. 14/755,221, filed Jun. 30, 2015, which is a continuation of U.S. patent application Ser. No. 14/190,429, filed Feb. 26, 2014, which was a continuation-in-part of U.S. patent application Ser. No. 13/340,988, filed Dec. 30, 2011, which was a continuation-in-part of U.S. patent application Ser. No. 12/131,876, filed Jun. 2, 2008.

BACKGROUND

The present invention relates to a gas turbine engine and more particularly to an engine mounting configuration for the mounting of a turbofan gas turbine engine to an aircraft pylon.

A gas turbine engine may be mounted at various points on an aircraft such as a pylon integrated with an aircraft structure. An engine mounting configuration ensures the transmission of loads between the engine and the aircraft structure. The loads typically include the weight of the engine, thrust, aerodynamic side loads, and rotary torque about the engine axis. The engine mount configuration must also absorb the deformations to which the engine is subjected during different flight phases and the dimensional variations due to thermal expansion and retraction.

One conventional engine mounting configuration includes a pylon having a forward mount and an aft mount with relatively long thrust links which extend forward from the aft mount to the engine intermediate case structure. Although effective, one disadvantage of this conventional type mounting arrangement is the relatively large "punch loads" into the engine cases from the thrust links which react the thrust from the engine and couple the thrust to the pylon. These loads tend to distort the intermediate case and the low pressure compressor (LPC) cases. The distortion may cause the clearances between the static cases and rotating blade tips to increase which may negatively affect engine performance and increase fuel burn.

SUMMARY

A gas turbine engine according to an exemplary aspect of the present disclosure includes a core nacelle defined about an engine centerline axis, a fan nacelle mounted at least partially around the core nacelle to define a fan bypass airflow path for a fan bypass airflow, a gear train defined along an engine centerline axis, the gear train defines a gear reduction ratio of greater than or equal to about 2.3, a spool along the engine centerline axis which drives the gear train, the spool includes a three to six (3-6) low pressure turbine, and a fan variable area nozzle axially movable relative to the fan nacelle to vary a fan nozzle exit area and adjust a pressure ratio of the fan bypass airflow during engine operation.

In a further non-limiting embodiment of any of the foregoing gas turbine engine embodiments, the gear train may define a gear reduction ratio of greater than or equal to about 2.5.

In a further non-limiting embodiment of any of the foregoing gas turbine engine embodiments, the engine may further include a controller operable to control the fan variable area nozzle to vary the fan nozzle exit area and adjust the pressure ratio of the fan bypass airflow.

In a further non-limiting embodiment of any of the foregoing gas turbine engine embodiments, the controller may be operable to reduce the fan nozzle exit area at a cruise flight condition. Additionally or alternatively, the controller may be operable to control the fan nozzle exit area to reduce a fan instability.

In a further non-limiting embodiment of any of the foregoing gas turbine engine embodiments, the fan variable area nozzle may define a trailing edge of the fan nacelle.

In a further non-limiting embodiment of any of the foregoing gas turbine engine embodiments, the gear train may drive a fan within the fan nacelle.

In a further non-limiting embodiment of any of the foregoing gas turbine engine embodiments, the low pressure turbine may be a five (5) stage low pressure turbine.

In a featured embodiment, a gas turbine engine comprises a gear train defined along an axis. A spool along the axis drives the gear train and includes a low stage count low pressure turbine. A fan is rotatable at a fan speed about the axis and driven by the low pressure turbine through the gear train. The fan speed is less than a speed of the low pressure turbine. A core is surrounded by a core nacelle defined about the axis. A fan nacelle is mounted at least partially around the core nacelle to define a fan bypass airflow path for a fan bypass airflow. A bypass ratio defined by the fan bypass passage airflow divided by airflow through the core is greater than about ten (10).

In another embodiment according to the previous embodiment, the low stage count includes six or fewer stages.

In another embodiment according to any of the previous embodiments, the low pressure turbine is one of three turbine rotors. The low pressure turbine drives the fan, while the other two of the turbine rotors each drive a compressor section.

In another embodiment according to any of the previous embodiments, a high pressure turbine is also included, with each of the low pressure turbine and the high pressure turbine driving a compressor rotor.

In another embodiment according to any of the previous embodiments, the gear train is positioned intermediate a compressor rotor driven by the low pressure turbine and the fan.

In another embodiment according to any of the previous embodiments, the gear train is positioned intermediate the low pressure turbine and the compressor rotor is driven by the low pressure turbine.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows:

FIG. 5A is a side view of the aft mount of FIG. 4A in a first slide position; and FIG. 5B is a side view of the aft mount of FIG. 4A in a second slide position.

FIG. 6 shows another embodiment.

FIG. 7 shows yet another embodiment.

DETAILED DESCRIPTION

Figure 1A:
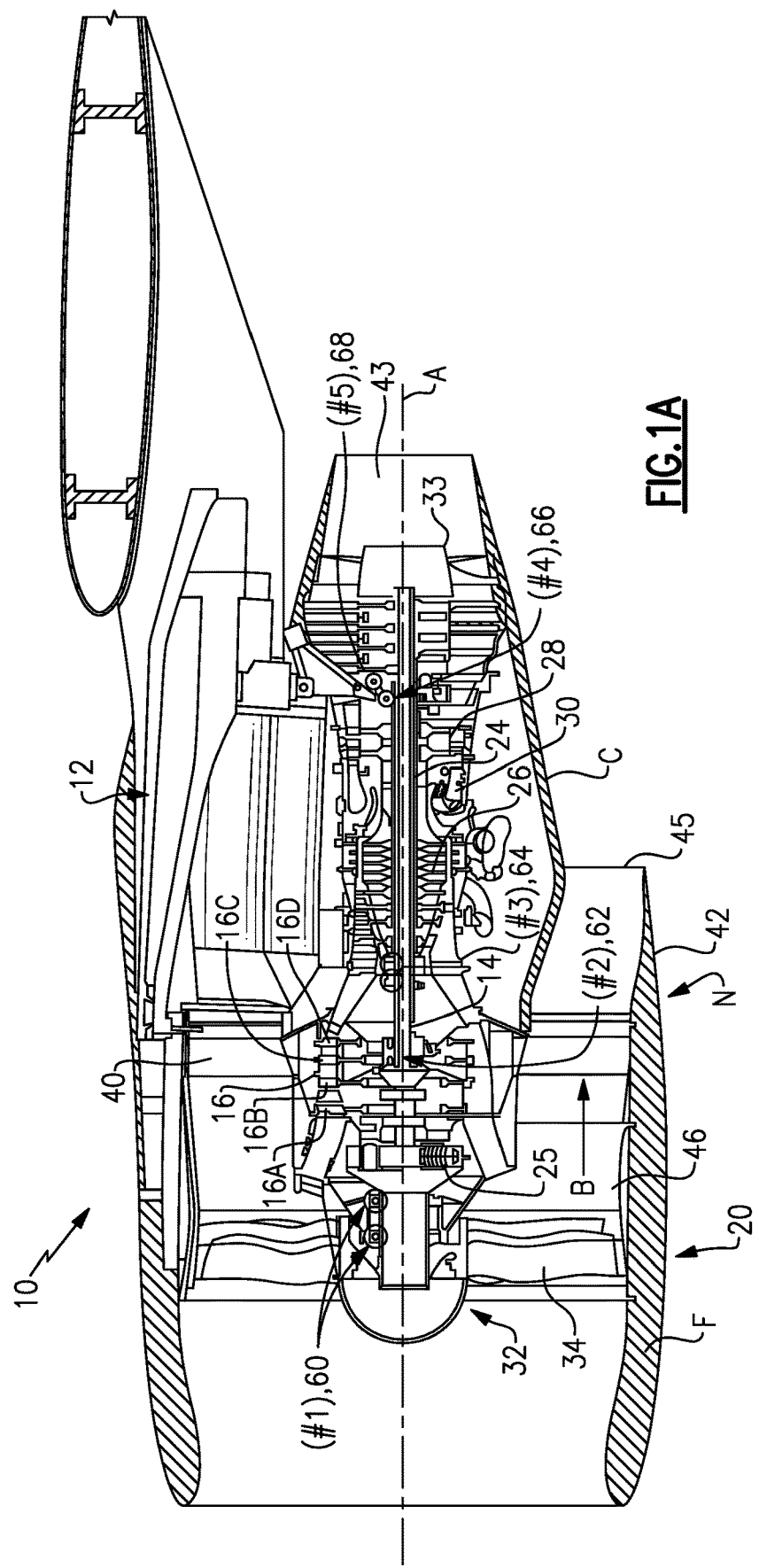
FIG. 1A is a general schematic sectional view through a gas turbine engine along the engine longitudinal axis.

FIG. 1A illustrates a general partial fragmentary schematic view of a gas turbofan engine 10 suspended from an engine pylon 12 within an engine nacelle assembly N as is typical of an aircraft designed for subsonic operation.

The turbofan engine 10 includes a core engine within a core nacelle C that houses a low spool 14 and high spool 24. The low spool 14 includes a low pressure compressor 16 and low pressure turbine 18. The low spool 14 drives a fan section 20 connected to the low spool 14 either directly or through a gear train 25.

The high spool 24 includes a high pressure compressor 26 and high pressure turbine 28. A combustor 30 is arranged between the high pressure compressor 26 and high pressure turbine 28. The low and high spools 14, 24 rotate about an engine axis of rotation A.

The engine 10 in one non-limiting embodiment is a high-bypass geared architecture aircraft engine. In one disclosed, non-limiting embodiment, the engine 10 bypass ratio is greater than about six (6), with an example embodiment being greater than about ten (10), the gear train 25 is an epicyclic gear train such as a planetary gear system or other gear system with a gear reduction ratio of greater than about 2.3 and the low pressure turbine 18 has a pressure ratio that is greater than about 5. In one disclosed embodiment, the engine 10 bypass ratio is greater than ten (10:1), the turbofan diameter is significantly larger than that of the low pressure compressor 16, and the low pressure turbine 18 has a pressure ratio that is greater than 5:1. The gear train 25 may be an epicycle gear train such as a planetary gear system or other gear system with a gear reduction ratio of greater than about 2.5:1. It should be understood, however, that the above parameters are only exemplary of one embodiment of a geared architecture engine and that the present invention is applicable to other gas turbine engines including direct drive turbofans.

Airflow enters the fan nacelle F which at least partially surrounds the core nacelle C. The fan section 20 communicates airflow into the core nacelle C to the low pressure compressor 16. Core airflow compressed by the low pressure compressor 16 and the high pressure compressor 26 is mixed with the fuel in the combustor 30 where is ignited, and burned. The resultant high pressure combustor products are expanded through the high pressure turbine 28 and low pressure turbine 18. The turbines 28, 18 are rotationally coupled to the compressors 26, 16 respectively to drive the compressors 26, 16 in response to the expansion of the combustor product. The low pressure turbine 18 also drives the fan section 20 through gear train 25. A core engine exhaust E exits the core nacelle C through a core nozzle 43 defined between the core nacelle C and a tail cone 33.

Figure 1B:
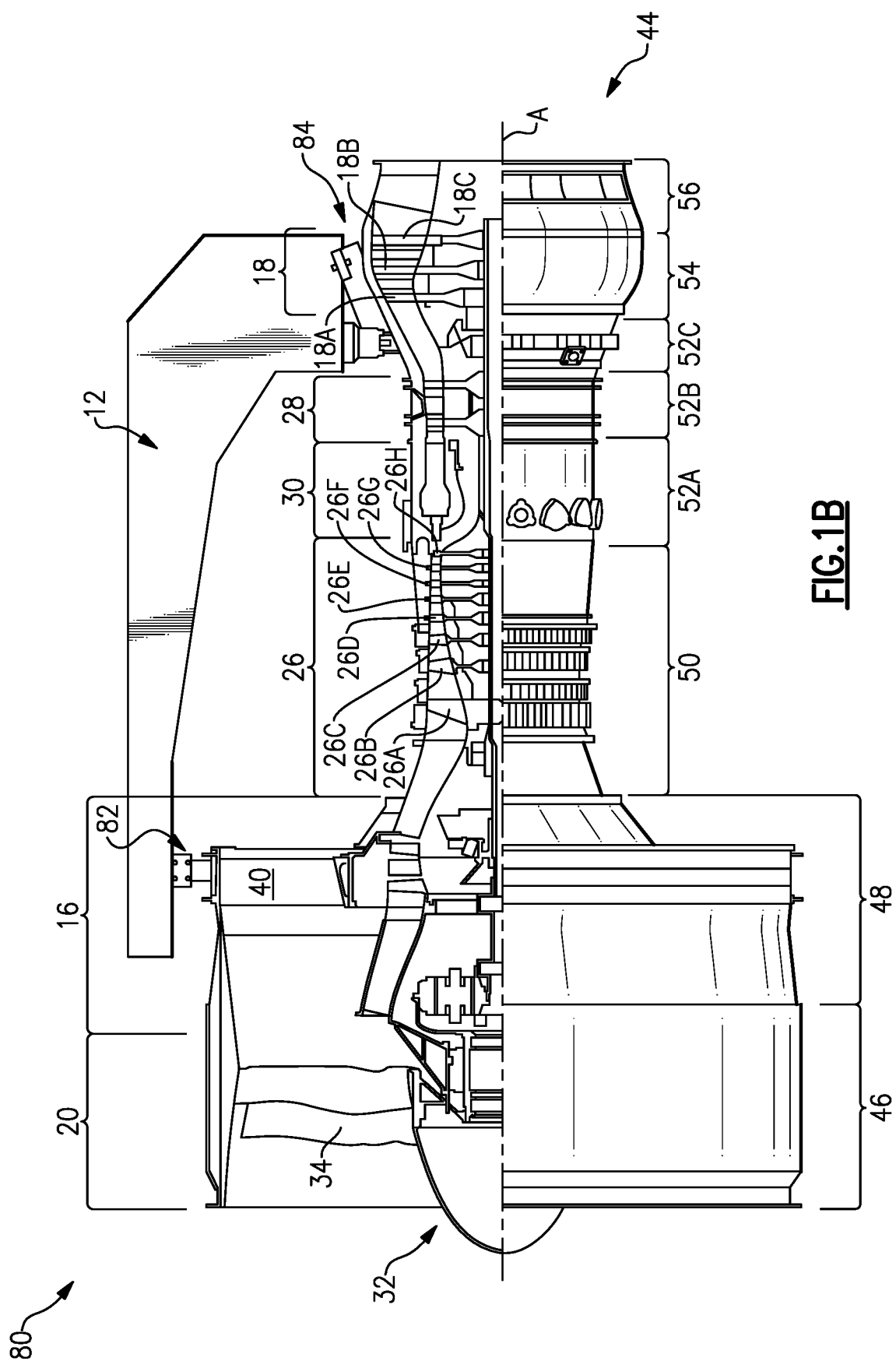
FIG. 1B is a general sectional view through a gas turbine engine along the engine longitudinal axis illustrating an engine static structure case arrangement on the lower half thereof.

With reference to FIG. 1B, the low pressure turbine 18 includes a low number of stages, which, in the illustrated non-limiting embodiment, includes three turbine stages, 18A, 18B, 18C. The gear train 25 operationally effectuates the significantly reduced number of stages within the low pressure turbine 18. The three turbine stages, 18A, 18B, 18C facilitate a lightweight and operationally efficient engine architecture. It should be appreciated that a low number of stages contemplates, for example, three to six (3-6) stages. Low pressure turbine 18 pressure ratio is pressure measured prior to inlet of low pressure turbine 18 as related to the pressure at the outlet of the low pressure turbine 18 prior to exhaust nozzle.

Thrust is a function of density, velocity, and area. One or more of these parameters can be manipulated to vary the amount and direction of thrust provided by the bypass flow B. The Variable Area Fan Nozzle ("VAFN") 42 operates to effectively vary the area of the fan nozzle exit area 45 to selectively adjust the pressure ratio of the bypass flow B in response to a controller (not shown). Low pressure ratio turbofans are desirable for their high propulsive efficiency. However, low pressure ratio fans may be inherently susceptible to fan stability/flutter problems at low power and low flight speeds. The VAFN 42 allows the engine to change to a more favorable fan operating line at low power, avoiding the instability region, and still provide the relatively smaller nozzle area necessary to obtain a high-efficiency fan operating line at cruise.

A significant amount of thrust is provided by the bypass flow B due to the high bypass ratio. The fan section 20 of the engine 10 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without the Fan Exit Guide Vane ("FEGV") system 36. The low fan pressure ratio as disclosed herein according to one non-limiting embodiment is less than about 1.45. "Low corrected fan tip speed" is the actual fan tip speed in ft/sec divided by an industry standard temperature correction of $[(Tambient\ deg\ R)/518.7]^{0.5}$. The "Low corrected fan tip speed" as disclosed herein according to one non-limiting embodiment is less than about 1150 ft/second.

As the fan blades within the fan section 20 are efficiently designed at a particular fixed stagger angle for an efficient cruise condition, the VAFN 42 is operated to effectively vary the fan nozzle exit area 45 to adjust fan bypass air flow such that the angle of attack or incidence on the fan blades is maintained close to the design incidence for efficient engine operation at other flight conditions, such as landing and takeoff to thus provide optimized engine operation over a range of flight conditions with respect to performance and other operational parameters such as noise levels.

The engine static structure 44 generally has sub-structures including a case structure often referred to as the engine backbone. The engine static structure 44 generally includes a fan case 46, an intermediate case (IMC) 48, a high pressure compressor case 50, a combustor case 52A, a high pressure turbine case 52B, a thrust case 52C, a low pressure turbine case 54, and a turbine exhaust case 56 (FIG. 1B). Alternatively, the combustor case 52A, the high pressure turbine case 52B and the thrust case 52C may be combined into a single case. It should be understood that this is an exemplary configuration and any number of cases may be utilized.

The fan section 20 includes a fan rotor 32 with a plurality of circumferentially spaced radially outwardly extending fan blades 34. The fan blades 34 are surrounded by the fan case 46. The core engine case structure is secured to the fan case 46 at the IMC 48 which includes a multiple of circumferentially spaced radially extending struts 40 which radially span the core engine case structure and the fan case 46.

The engine static structure 44 further supports a bearing system upon which the turbines 28, 18, compressors 26, 16 and fan rotor 32 rotate. A #1 fan dual bearing 60 which rotationally supports the fan rotor 32 is axially located generally within the fan case 46. The #1 fan dual bearing 60 is preloaded to react fan thrust forward and aft (in case of surge). A #2 LPC bearing 62 which rotationally supports the low spool 14 is axially located generally within the intermediate case (IMC) 48. The #2 LPC bearing 62 reacts thrust. A #3 fan dual bearing 64 which rotationally supports the high spool 24 and also reacts thrust. The #3 fan bearing 64 is also axially located generally within the IMC 48 just forward of the high pressure compressor case 50. A #4 bearing 66 which rotationally supports a rear segment of the low spool 14 reacts only radial loads. The #4 bearing 66 is axially located generally within the thrust case 52C in an aft section thereof. A #5 bearing 68 rotationally supports the rear segment of the low spool 14 and reacts only radial loads. The #5 bearing 68 is axially located generally within the thrust case 52C just aft of the #4 bearing 66. It should be understood that this is an exemplary configuration and any number of bearings may be utilized.

Figure 1C:
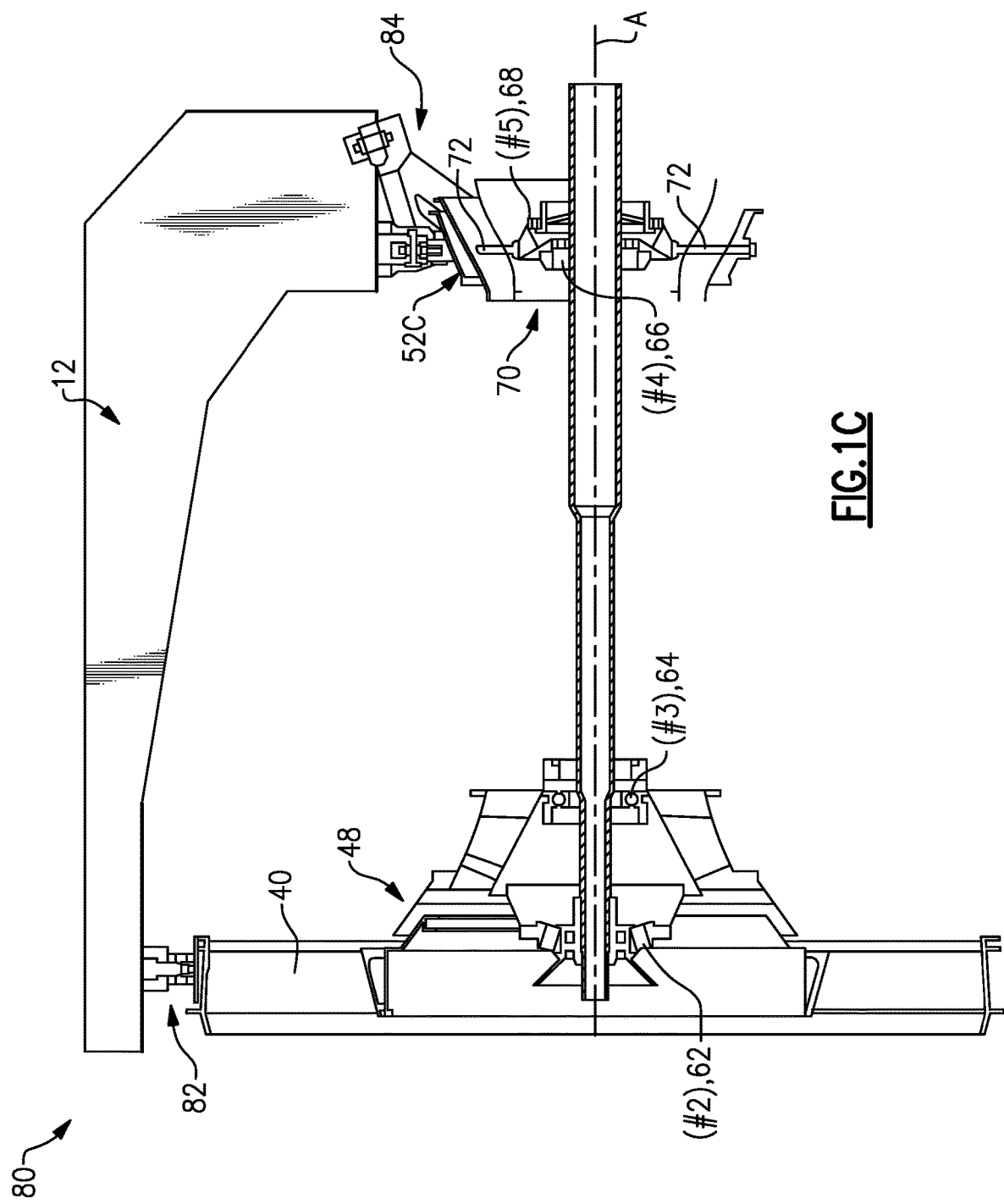
FIG. 1C is a side view of an mount system illustrating a rear mount attached through an engine thrust case to a mid-turbine frame between a first and second bearing supported thereby.
Figure 1D:
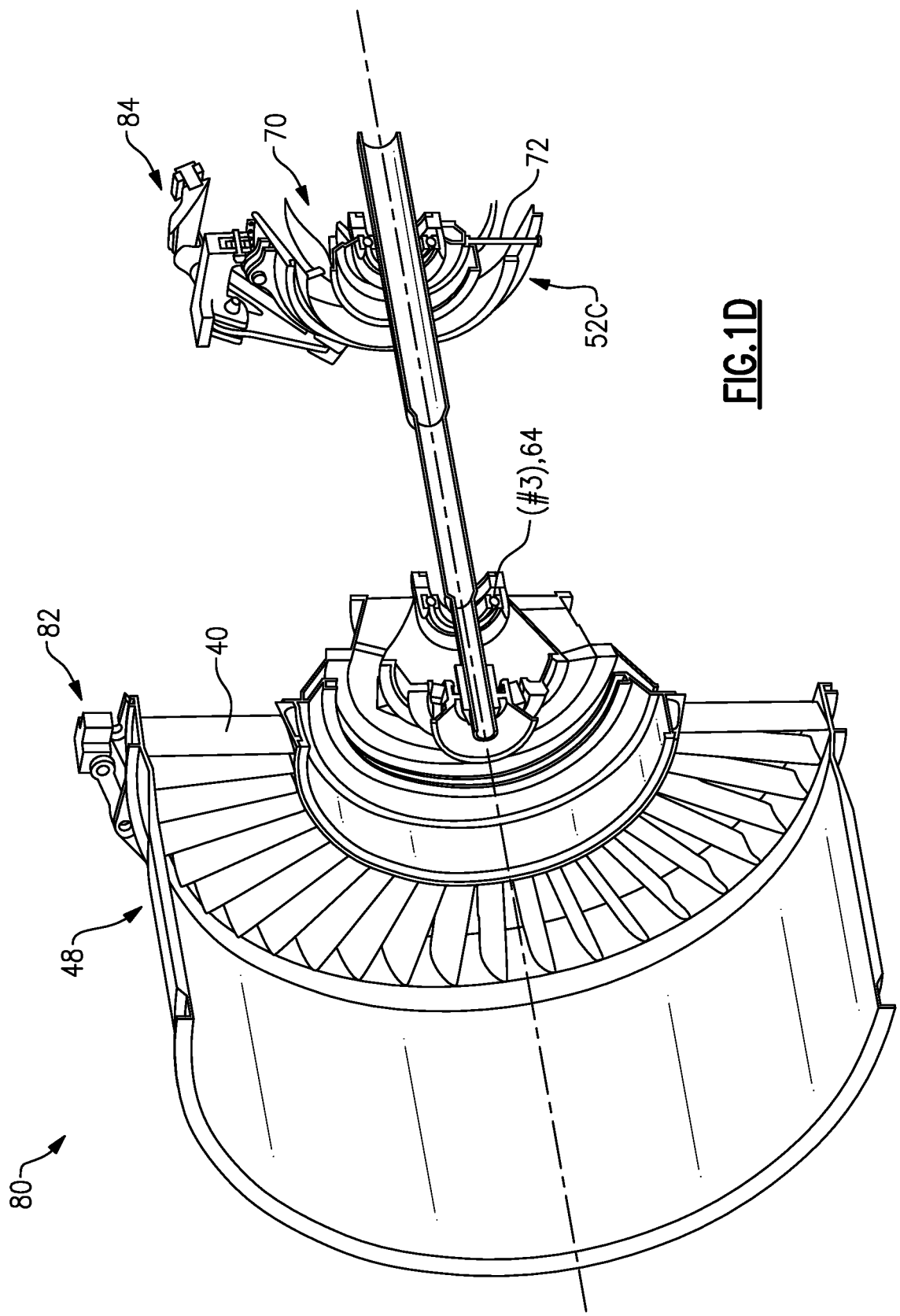
FIG. 1D is a forward perspective view of an mount system illustrating a rear mount attached through an engine thrust case to a mid-turbine frame between a first and second bearing supported thereby.

The #4 bearing 66 and the #5 bearing 68 are supported within a mid-turbine frame (MTF) 70 to straddle radially extending structural struts 72 which are preloaded in tension (FIGS. 1C-1D). The MTF 70 provides aft structural support within the thrust case 52C for the #4 bearing 66 and the #5 bearing 68 which rotatably support the spools 14, 24.

A dual rotor engine such as that disclosed in the illustrated embodiment typically includes a forward frame and a rear frame that support the main rotor bearings. The intermediate case (IMC) 48 also includes the radially extending struts 40 which are generally radially aligned with the #2 LPC bearing 62 (FIG. 1B). It should be understood that various engines with various case and frame structures will benefit from the present invention.

Figure 2A:
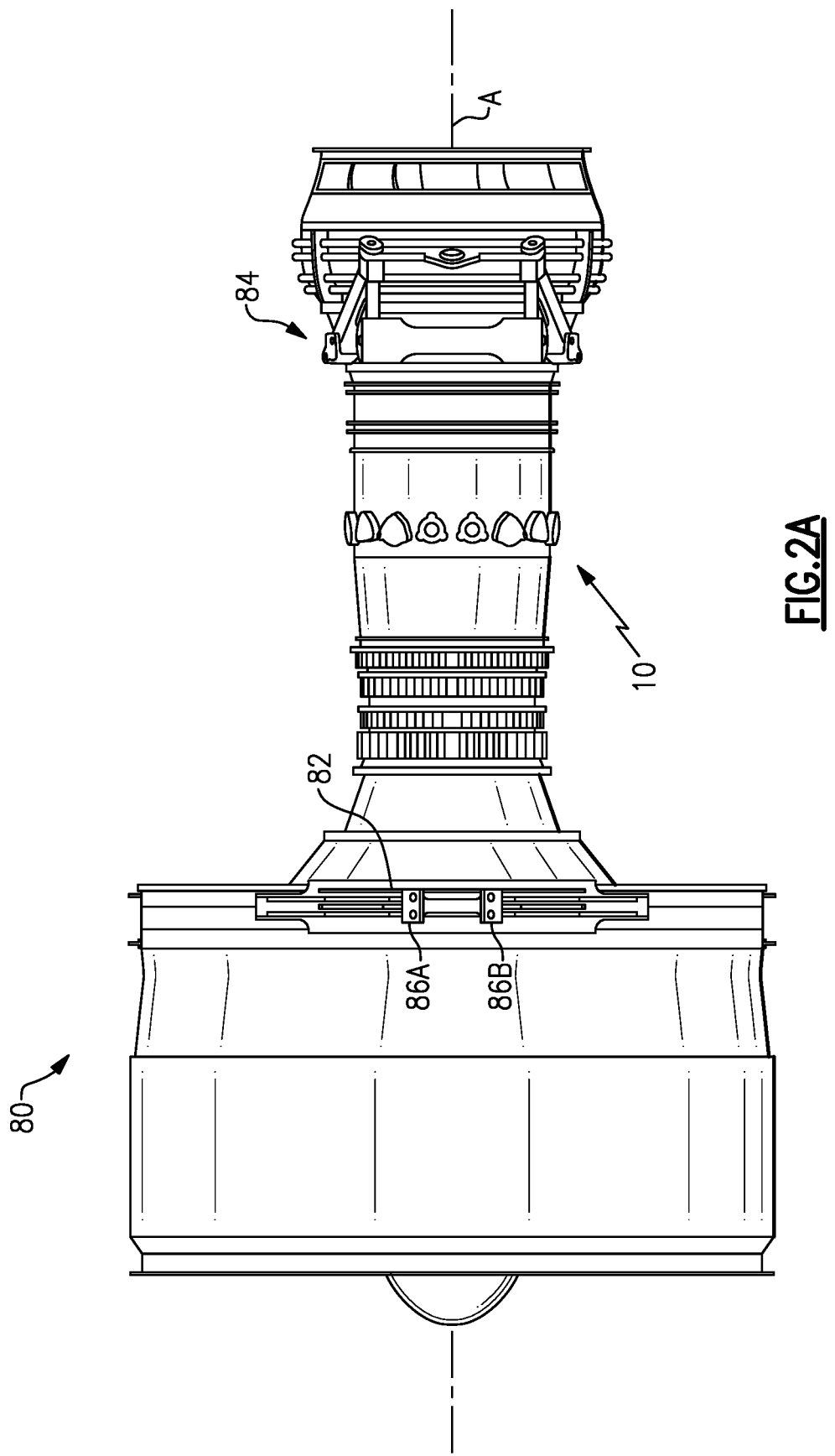
FIG. 2A is a top view of an engine mount system.

The turbofan gas turbine engine 10 is mounted to aircraft structure such as an aircraft wing through a mount system 80 attachable by the pylon 12. The mount system 80 includes a forward mount 82 and an aft mount 84 (FIG. 2A). The forward mount 82 is secured to the IMC 48 and the aft mount 84 is secured to the MTF 70 at the thrust case 52C. The forward mount 82 and the aft mount 84 are arranged in a plane containing the axis A of the turbofan gas turbine engine 10. This eliminates the thrust links from the intermediate case, which frees up valuable space beneath the core nacelle and minimizes IMC 48 distortion.

Figure 2B:
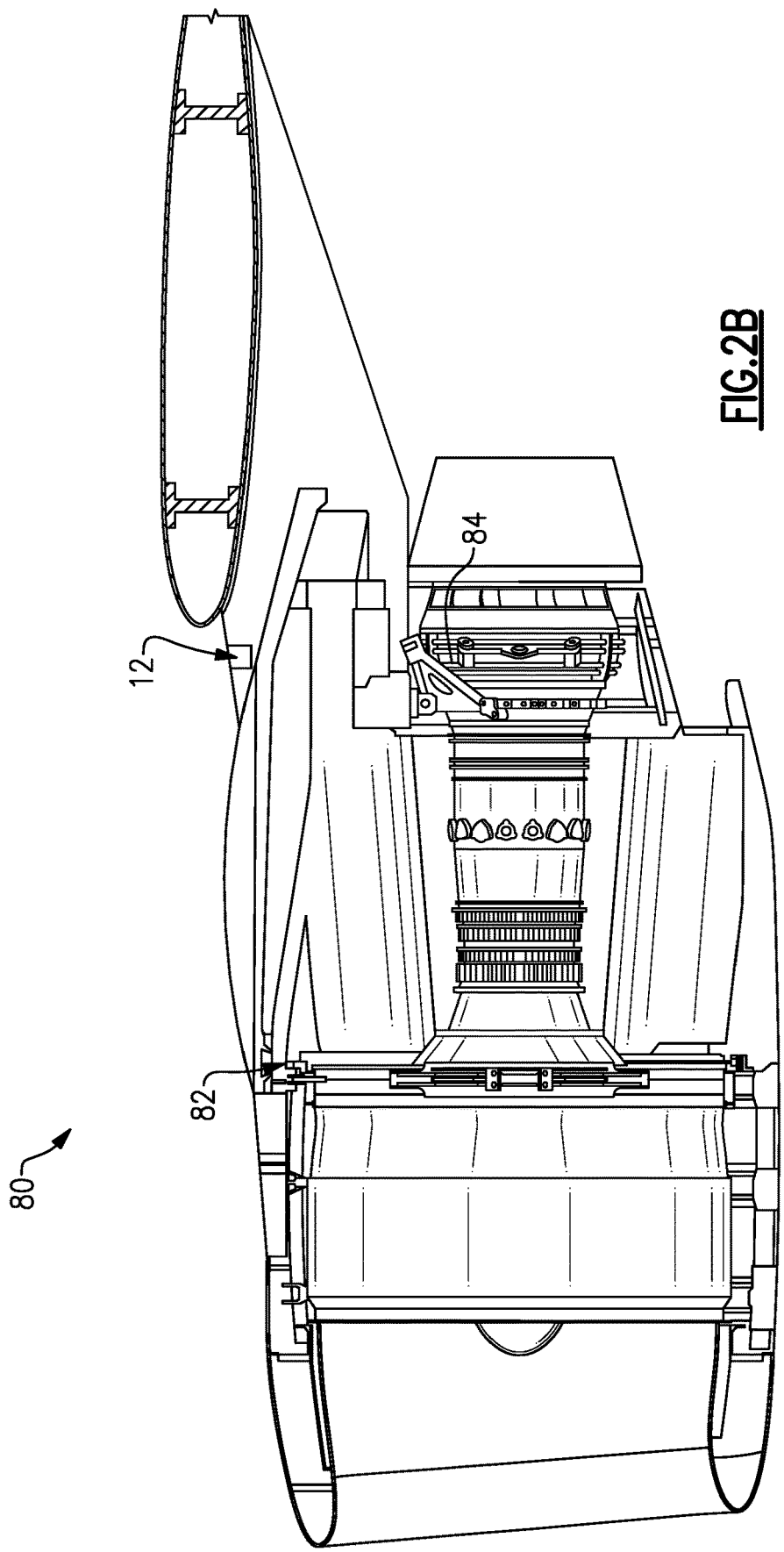
FIG. 2B is a side view of an engine mount system within a nacelle system.
Figure 2C:
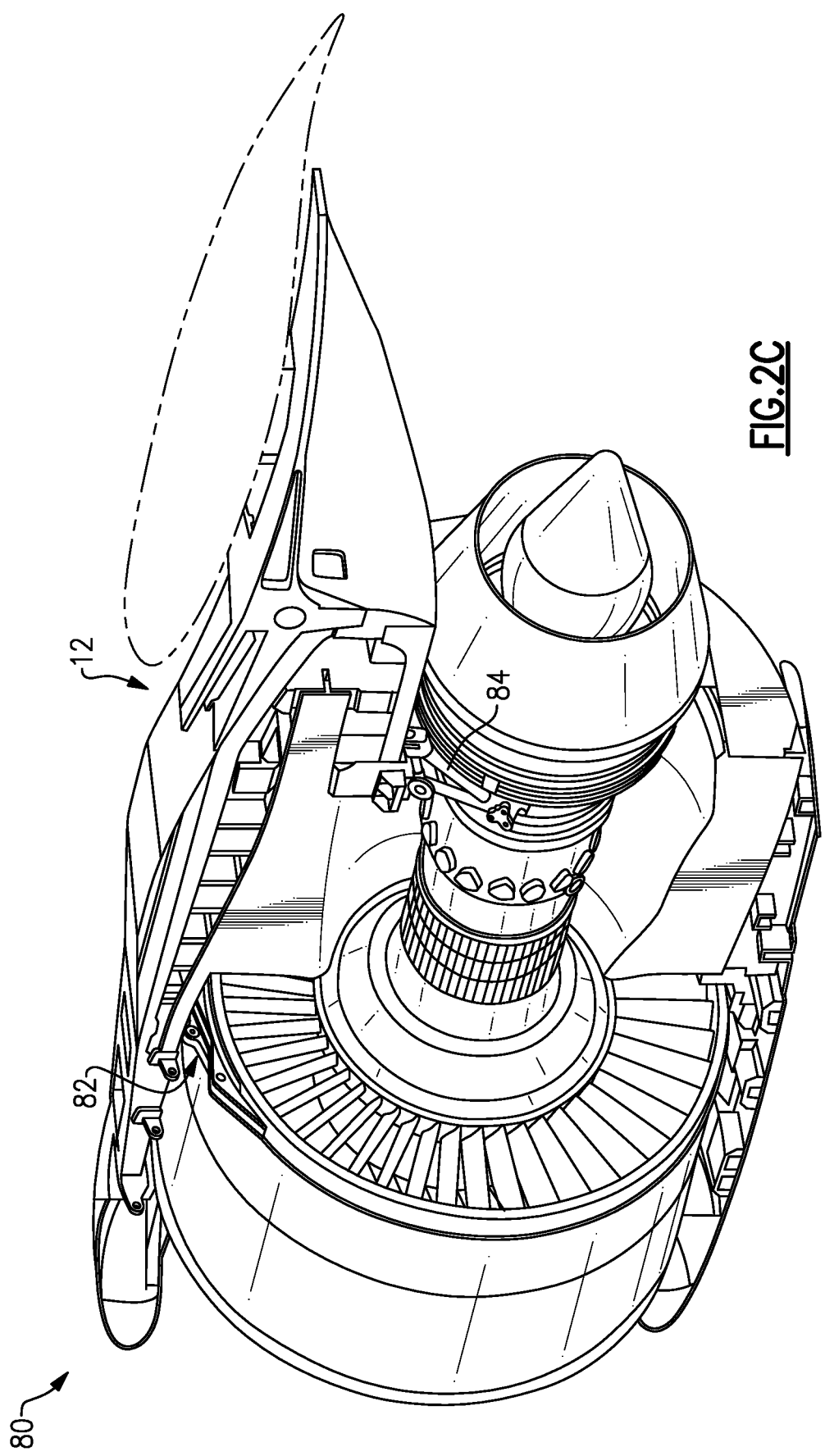
FIG. 2C is a forward perspective view of an engine mount system within a nacelle system.

Referring to FIGS. 2A-2C, the mount system 80 reacts the engine thrust at the aft end of the engine 10. The term "reacts" as utilized in this disclosure is defined as absorbing a load and dissipating the load to another location of the gas turbine engine 10.

Figure 3:
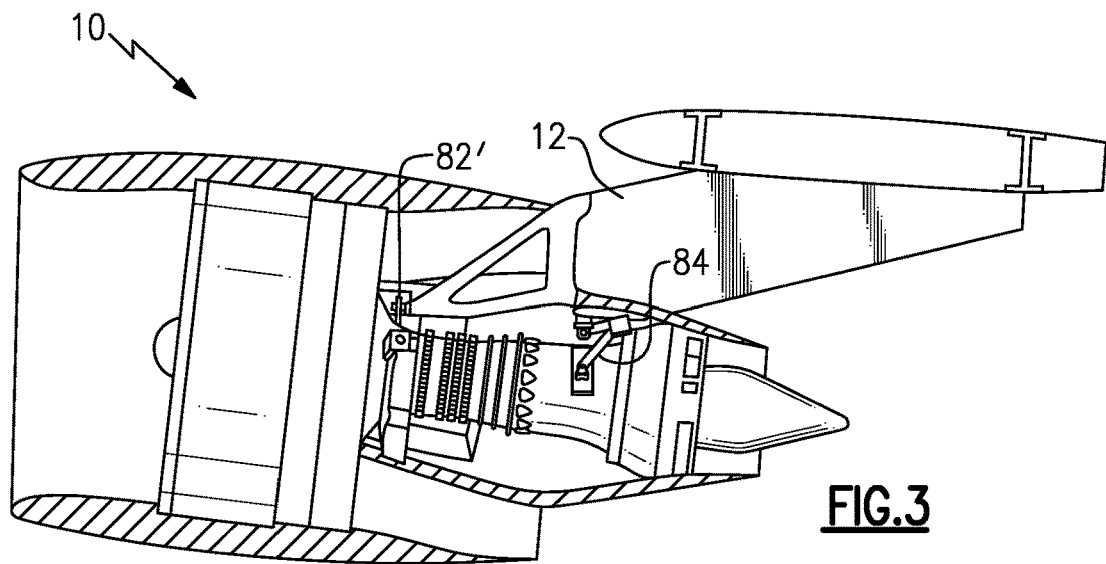
FIG. 3 is a side view of an engine mount system within another front mount.

The forward mount 82 supports vertical loads and side loads. The forward mount 82 in one non-limiting embodiment includes a shackle arrangement which mounts to the IMC 48 at two points 86A, 86B. The forward mount 82 is generally a plate-like member which is oriented transverse to the plane which contains engine axis A. Fasteners are oriented through the forward mount 82 to engage the intermediate case (IMC) 48 generally parallel to the engine axis A. In this illustrated non-limiting embodiment, the forward mount 82 is secured to the IMC 48. In another non-limiting embodiment, the forward mount 82 is secured to a portion of the core engine, such as the high-pressure compressor case 50 of the gas turbine engine 10 (see FIG. 3). One of ordinary skill in the art having the benefit of this disclosure would be able to select an appropriate mounting location for the forward mount 82.

Figure 4A:
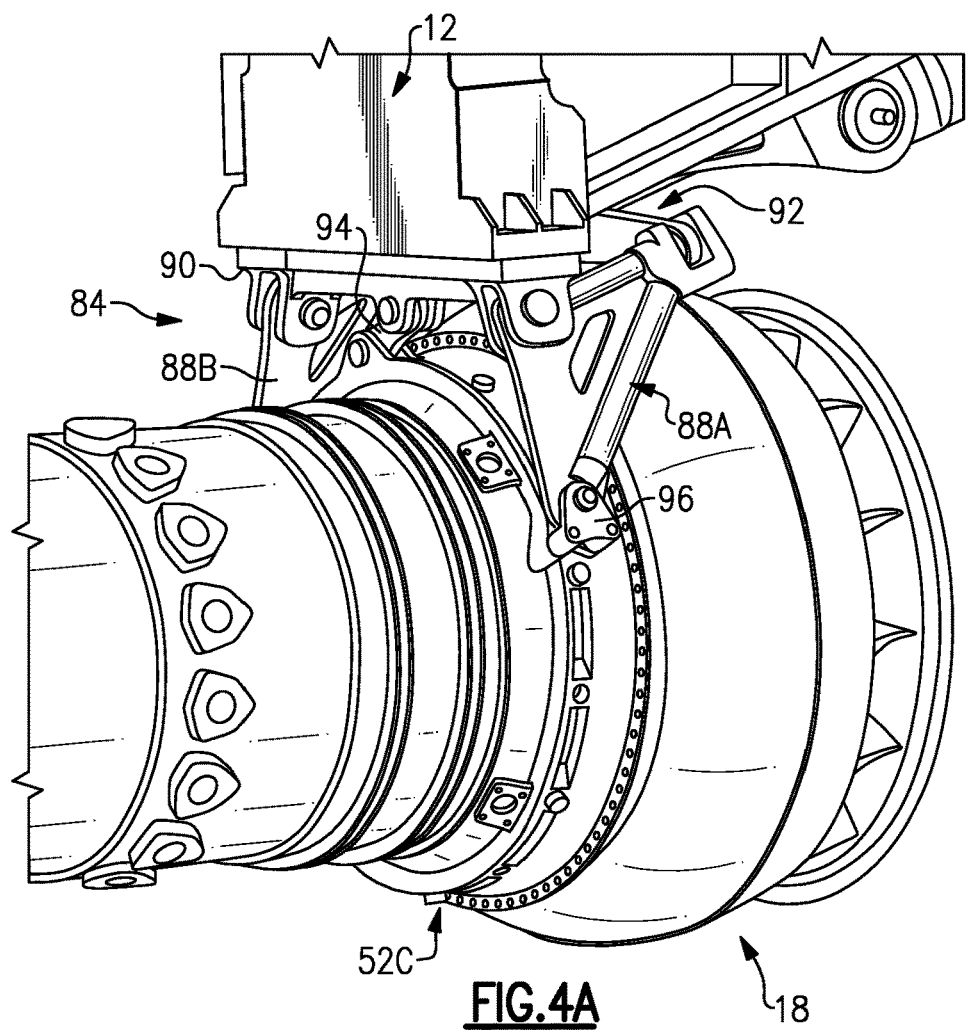
FIG. 4A is an aft perspective view of an aft mount.

Referring to FIG. 4A, the aft mount 84 generally includes a first A-arm 88A, a second A-arm 88B, a rear mount platform 90, a whiffle tree assembly 92 and a drag link 94. The rear mount platform 90 is attached directly to aircraft structure such as the pylon 12. The first A-arm 88A and the second A-arm 88B mount between the thrust case 52C at case bosses 96 which interact with the MTF 70 (FIGS. 4B-4C), the rear mount platform 90 and the whiffle tree assembly 92. It should be understood that the first A-arm 88A and the second A-arm 88B may alternatively mount to other areas of the engine 10 such as the high pressure turbine case or other cases. It should also be understood that other frame arrangements may alternatively be used with any engine case arrangement.

Figure 4B:
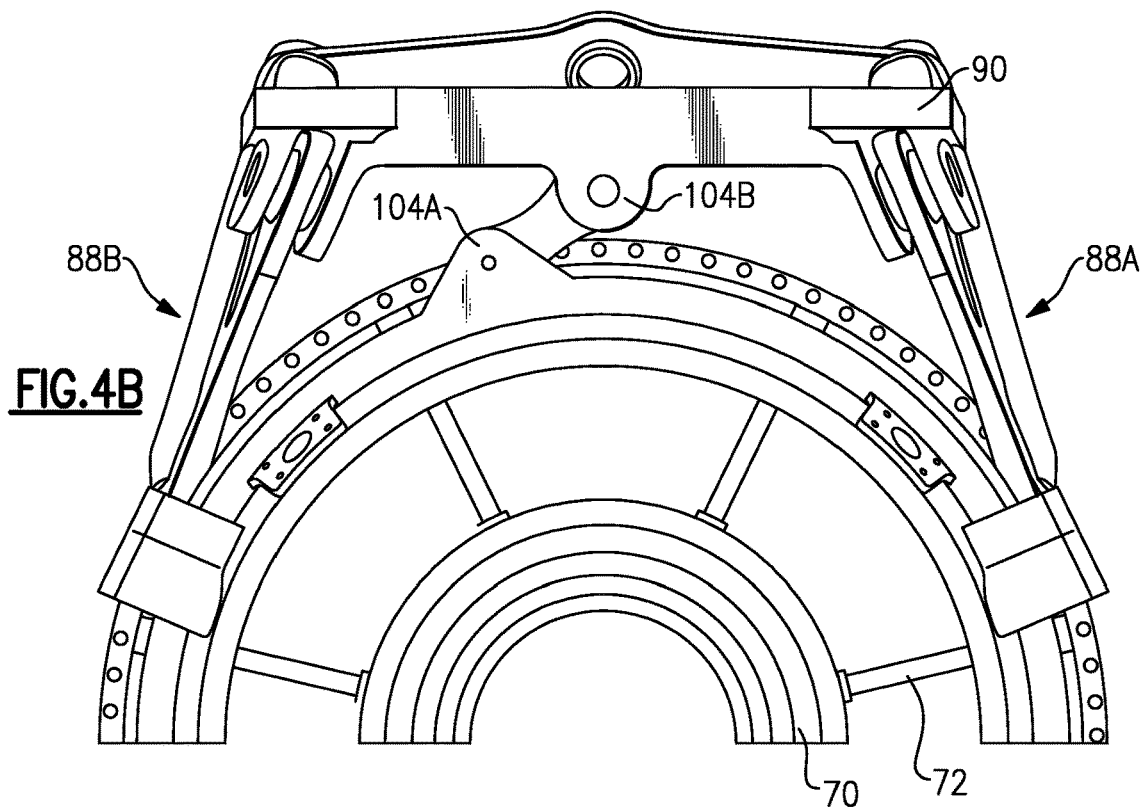
FIG. 4B is an aft view of an aft mount of FIG. 4A.
Figure 4C:
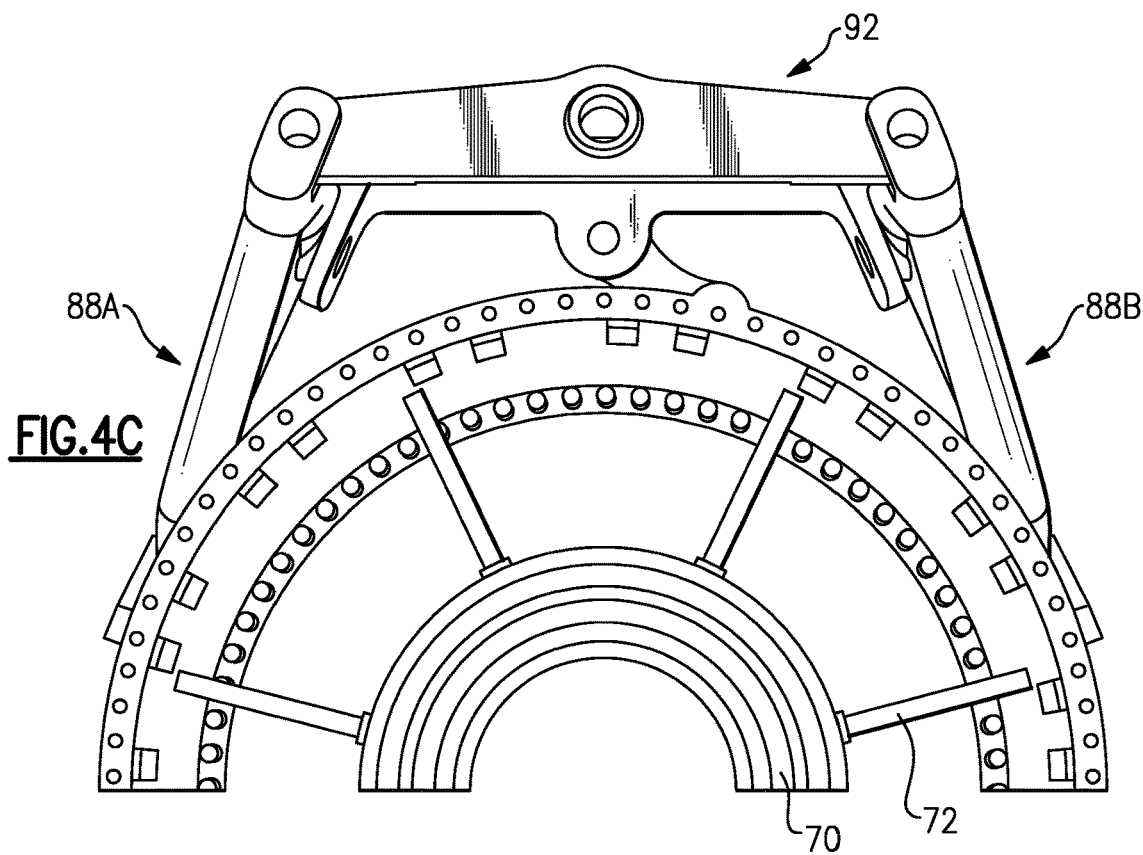
FIG. 4C is a front view of the aft mount of FIG. 4A.
Figure 4D:
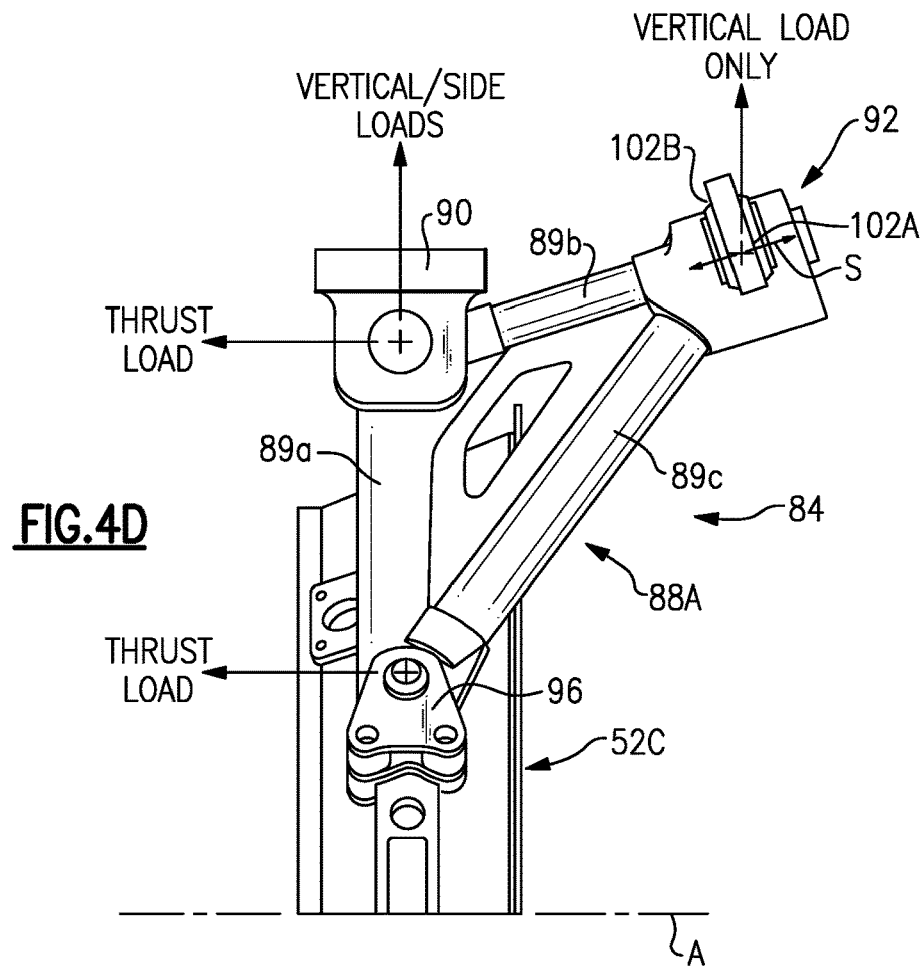
FIG. 4D is a side view of the aft mount of FIG. 4A.

Referring to FIG. 4D, the first A-arm 88A and the second A-arm 88B are rigid generally triangular arrangements, each having a first link arm 89a, a second link arm 89b and a third link arm 89c. The first link arm 89a is between the case boss 96 and the rear mount platform 90. The second link arm 89b is between the case bosses 96 and the whiffle tree assembly 92. The third link arm 89c is between the whiffle tree assembly 92 rear mount platform 90. The first A-arm 88A and the second A-arm 88B primarily support the vertical weight load of the engine 10 and transmit thrust loads from the engine to the rear mount platform 90.

The first A-arm 88A and the second A-arm 88B of the aft mount 84 force the resultant thrust vector at the engine casing to be reacted along the engine axis A which minimizes tip clearance losses due to engine loading at the aft mount 84. This minimizes blade tip clearance requirements and thereby improves engine performance.

Figure 4E:
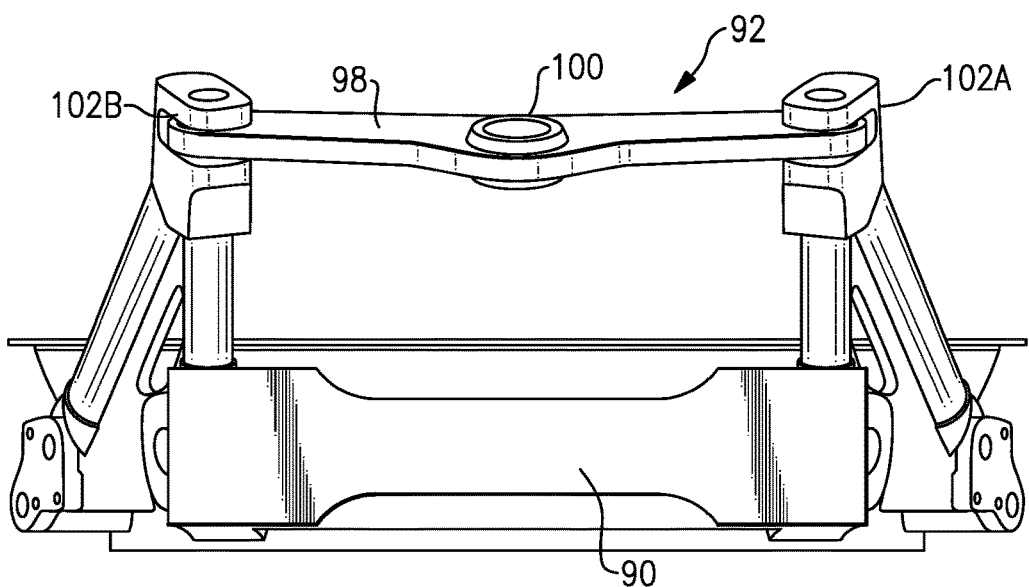
FIG. 4E is a top view of the aft mount of FIG. 4A.

The whiffle tree assembly 92 includes a whiffle link 98 which supports a central ball joint 100, a first sliding ball joint 102A and a second sliding ball joint 102B (FIG. 4E). It should be understood that various bushings, vibration isolators and such like may additionally be utilized herewith. The central ball joint 100 is attached directly to aircraft structure such as the pylon 12. The first sliding ball joint 102A is attached to the first A-arm 88A and the second sliding ball joint 102B is mounted to the first A-arm 88A. The first and second sliding ball joint 102A, 102B permit sliding movement of the first and second A-arm 88A, 88B (illustrated by arrow S in FIGS. 5A and 5B) to assure that only a vertical load is reacted by the whiffle tree assembly 92. That is, the whiffle tree assembly 92 allows all engine thrust loads to be equalized transmitted to the engine pylon 12 through the rear mount platform 90 by the sliding movement and equalize the thrust load that results from the dual thrust link configuration. The whiffle link 98 operates as an equalizing link for vertical loads due to the first sliding ball joint 102A and the second sliding ball joint 102B. As the whiffle link 98 rotates about the central ball joint 100 thrust forces are equalized in the axial direction. The whiffle tree assembly 92 experiences loading only due to vertical loads, and is thus less susceptible to failure than conventional thrust-loaded designs.

The drag link 94 includes a ball joint 104A mounted to the thrust case 52C and ball joint 104B mounted to the rear mount platform 90 (FIGS. 4B-4C). The drag link 94 operates to react torque.

The aft mount 84 transmits engine loads directly to the thrust case 52C and the MTF 70. Thrust, vertical, side, and torque loads are transmitted directly from the MTF 70 which reduces the number of structural members as compared to current in-practice designs.

The mount system 80 is compact, and occupies space within the core nacelle volume as compared to turbine exhaust case-mounted configurations, which occupy space outside of the core nacelle which may require additional or relatively larger aerodynamic fairings and increase aerodynamic drag and fuel consumption. The mount system 80 eliminates the heretofore required thrust links from the IMC, which frees up valuable space adjacent the IMC 48 and the high pressure compressor case 50 within the core nacelle C.

It should be understood that relative positional terms such as "forward," "aft," "upper," "lower," "above," "below," and the like are with reference to the normal operational attitude of the vehicle and should not be considered otherwise limiting.

FIG. 6 shows an embodiment 200, wherein there is a fan drive turbine 208 driving a shaft 206 to in turn drive a fan rotor 202. A gear reduction 204 may be positioned between the fan drive turbine 208 and the fan rotor 202. This gear reduction 204 may be structured and operate like the gear reduction disclosed above. A compressor rotor 210 is driven by an intermediate pressure turbine 212, and a second stage compressor rotor 214 is driven by a turbine rotor 216. A combustion section 218 is positioned intermediate the compressor rotor 214 and the turbine section 216.

FIG. 7 shows yet another embodiment 300 wherein a fan rotor 302 and a first stage compressor 304 rotate at a common speed. The gear reduction 306 (which may be structured as disclosed above) is intermediate the compressor rotor 304 and a shaft 308 which is driven by a low pressure turbine section.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A gas turbine engine comprising:
   a propulsor section including a rotor and a plurality of blades;
   an epicyclic gear train having a gear reduction ratio of greater than 2.5:1;
   a compressor section including a first compressor and a second compressor axially aft of the first compressor relative to an engine axis, the first compressor including three stages, and the second compressor including a greater number of stages than the first compressor;
   a turbine section including a first turbine and a second turbine, the first turbine including two stages, the second turbine including a greater number of stages than the first turbine but including a lesser number of stages than the second compressor, and the second turbine having a pressure ratio greater than 5:1 and driving the rotor through the gear train; and
   a static structure comprising a plurality of cases distributed along the engine axis, wherein the plurality of cases includes a first case and a second case positioned aft of the first case relative to the engine axis, the first case includes a first engine mount location, the second case includes a second engine mount location that reacts an engine thrust in operation, wherein the first engine mount location is axially near the gear train relative to the engine axis, and each of the first engine mount location and second engine mount location supporting an engine mount when the engine is mounted; and
   wherein the static structure supports a bearing system, and wherein the first turbine, the second turbine and the rotor are rotatably supported by the bearing system.

2. The gas turbine engine as recited in claim 1, wherein the epicyclic gear train is a planetary gear system.

3. The gas turbine engine as recited in claim 2, wherein the second engine mount location is configured so as to not be connected to the first case by any thrust links when the gas turbine engine is mounted.

4. The gas turbine engine as recited in claim 2, wherein the plurality of blades have a fixed stagger angle.

5. The gas turbine engine as recited in claim 2, wherein the propulsor delivers airflow to an entrance of a core flow path, the core flow path extends through the compressor section, and the epicyclic gear train extends axially aft of the entrance relative to the engine axis.

6. The gas turbine engine as recited in claim 5, wherein the second turbine includes no more than six stages.

7. The gas turbine engine as recited in claim 2, wherein the first case is a compressor case.

8. The gas turbine engine as recited in claim 2, wherein:
   the second case is a thrust case; and
   the turbine section includes a mid-turbine frame axially between first and second turbines relative to the engine axis, and the mid-turbine frame supports bearings of the bearing system within the thrust case.

9. The gas turbine engine as recited in claim 2, wherein the propulsor is a fan, and further comprising:
   a first nacelle which at least partially surrounds a second nacelle and the rotor, the first nacelle having a first exit, the second nacelle having a second exit at an axial location aft of the first exit along the engine axis, and the fan communicates airflow into the first nacelle and the second nacelle; and a bypass ratio of greater than 10:1.

10. The gas turbine engine as recited in claim 9, further comprising a fan pressure ratio of less than 1.45 across the blade alone at cruise at 0.8 Mach and 35,000 feet.

11. The gas turbine engine as recited in claim 10, wherein the second turbine includes no more than six stages, and the second compressor includes seven stages.

12. A gas turbine engine comprising:
a propulsor section including a rotor with a plurality of blades;
an epicyclic gear train having a gear reduction ratio of greater than 2.5:1;
a first spool including a first compressor and a first turbine, wherein the first compressor includes a plurality of stages, the first turbine includes three stages, and the first turbine drives the rotor through the gear train;
a second spool including a second compressor and a second turbine, wherein the second turbine includes two stages, the first turbine includes a greater number of stages than the second turbine but includes a lesser number of stages than the second compressor, and the first and second spools are rotatable about an engine axis; and
a static structure comprising a first case and a first static structure component located forward of a second static structure component, the first static structure component having a first engine mount location, the second static structure component having a second engine mount location, each of the first engine mount location and the second engine mount location supporting an engine mount when the engine is mounted, and the first engine mount location is axially near the gear train relative to the engine axis.

13. The gas turbine engine as recited in claim 12, wherein:
the engine mount includes a forward mount associated with the first engine mount location and an aft mount associated with the second engine mount location;
the aft mount reacts a thrust vector of a thrust load along the engine axis at a second case in operation; and
the forward mount reacts a vertical load and a side load in operation.

14. The gas turbine engine as recited in claim 13, wherein the first case is an intermediate case that at least partially surrounds the gear train.

15. The gas turbine engine as recited in claim 13, wherein the first case is a compressor case.

16. The gas turbine engine as recited in claim 13, wherein:
the second case is a thrust case; and
the turbine section includes a mid-turbine frame axially between first and second turbines relative to the engine axis, the mid-turbine frame supports a pair of bearings of the bearing system within the thrust case, and the pair of bearings rotatably support the first and second spools.

17. The gas turbine engine as recited in claim 16, wherein the first compressor includes three stages, the first turbine includes no more than six stages, and the second compressor includes seven stages.

18. The gas turbine engine as recited in claim 16, wherein the propulsor section is a fan section including a fan case, the propulsor is a fan, and the fan case surrounds the fan.

19. The gas turbine engine as recited in claim 18, further comprising a bypass ratio of greater than 10:1.

* * * * *